United States Patent [19]

Nagaishi et al.

[11] Patent Number: 5,712,700
[45] Date of Patent: Jan. 27, 1998

[54] IMAGING APPARATUS INCLUDING A PIXEL SHIFTING MEANS

[75] Inventors: Katsuya Nagaishi; Yukinori Koizumi; Takashi Minaki; Hiroshi Hasegawa; Keiichi Kawazu, all of Hachioji, Japan

[73] Assignee: Konica Corporatioin, Tokyo, Japan

[21] Appl. No.: 575,896

[22] Filed: Dec. 20, 1995

[30] Foreign Application Priority Data

Dec. 26, 1994 [JP] Japan .................................. 6-321106
Dec. 27, 1994 [JP] Japan .................................. 6-324895
Dec. 27, 1994 [JP] Japan .................................. 6-324897

[51] Int. Cl.$^6$ .................... H04N 5/335; H04N 1/00; G03B 27/32; G03B 27/72
[52] U.S. Cl. .................. 355/35; 355/55; 355/71; 348/264; 358/448
[58] Field of Search .................. 396/500, 554; 355/55, 56, 32, 35, 36, 38, 67, 69, 71, 79; 348/264; 358/448; 382/254, 255, 293

[56] References Cited

U.S. PATENT DOCUMENTS

| | | | |
|---|---|---|---|
| 4,618,990 | 10/1986 | Sieb, Jr. et al. .................... | 382/266 |
| 4,731,671 | 3/1988 | Alkofer .................... | 358/284 |
| 4,903,068 | 2/1990 | Shiota .................... | 355/20 |
| 5,043,803 | 8/1991 | Asaida .................... | 348/264 |
| 5,194,891 | 3/1993 | Gan .................... | 355/38 |

FOREIGN PATENT DOCUMENTS 07245763  3/1994  Japan .

*Primary Examiner*—Arthur T. Grimley
*Assistant Examiner*—Herbert V. Kerner
*Attorney, Agent, or Firm*—Frishauf, Holtz, Goodman, Langer & Chick

[57] ABSTRACT

An image pick-up apparatus includes, an image pickup device having a plurality of pixels disposed with a predetermined distance therebetween to pick up an image on a photographic original with respect to a plurality of colors; an image forming device having an optical axis, to form the image of the photographic original onto the image pickup device; a pixel shifting device to shift a focal point of the image on the image pickup device by a distance shorter than a distance between the pixels of the image pickup device; a plurality of color filters having a plurality of colors different from each other; and a filter selector to select a color filter from the plurality of color filters and for disposing the color filter between the photographic original and the image pickup device. The image pick-up apparatus further includes a controller to control the image pickup device to pick up the image of the photographic original in a first condition that makes the pixel shifting device operative, and to pick up the image of the photographic original in a second condition that makes the pixel shifting device inoperative, at each time when the controller controls the filter selector to change a color filter to another color filter of the plurality of color filters.

15 Claims, 17 Drawing Sheets

IMAGING APPARATUS INCLUDING A PIXEL SHIFTING MEANS

BACKGROUND OF THE INVENTION

The present invention relates to an improved photographic original imaging apparatus which pick up the photographic image of a photographic original.

Heretofore, a photographic original imaging apparatus which picks up the photographic image of the photographic original by means of an imaging apparatus having low resolution (ordinarily, 400,000 pixels or less) are known.

For picking up a color image by means of an image shift method, when a procedure wherein, after one color image is picked up by means of the image shift method, images of other colors are picked up, there is a problem that the positional relation of formed points after image-shifting may not be reproduced correctly so that images are shifted for each color. In addition, there is also a problem that image shifting must be conducted for several colors.

In addition, when the amount of shifting is reduced in the image shifting method so that the pick-up image with a high pixel number is picked up, it takes a long time though the resolution is high. On the other hand, when an amount of shifting is increased in the image shifting method so that the pick-up image with a low pixel number is picked up, resolution decreases though it takes a short time. Accordingly, there was no imaging apparatus by means of the image shift method which could concurrently be utilized for an application which allows a long time though the resolution was high and an application which allows low resolution though it took a short time.

In addition, in a photographic original imaging apparatus which picks up the photographic image of a photographic original for plural colors after determining exposure, when the exposure is determined by means of image data of plural colors, it takes too much time for determining the exposure to be of practical use. When the exposure is determined by means of the image data of one color, an appropriate exposure cannot be obtained if there is a color failure on the photographic original.

In addition, it was assumed that, in the case of imaging by means of the image shift, the appropriate exposure conditions change since imaging is started until it is finished. However, if the exposure is determined every time images are shifted in the photographic original imaging apparatus which picks up the photographic image of an photographic original for plural colors after determining the exposure, there is a problem that it takes too much time for determining the exposure. Therefore, it was discovered that the appropriate exposure conditions are not changed from when imaging is started until it is finished even in the case of imaging by the use of the image shift method.

As explained above, in the case of imaging by means of the image shift method, the appropriate exposure conditions are not changed markedly from when imaging is started until it is finished. However, there may also be cases when exposure control which requires higher accuracy is necessary.

Heretofore, replacement of a light source for imaging in the photographic original imaging apparatus, having a light source for imaging, which can pick up by the use of the image shift method was considered. In addition, accuracy between the pick-up lens means, the image shift lens means and the photographic original imaging means is demanded.

When plural colors are picked up through a color filter, which is inserted in the exposure optical axis, in the photographic original imaging apparatus which picks up the photographic image of a photographic original for plural colors, the picked up images are deteriorated in terms of quality due to the internal reflection of the entered light from the color filter.

In addition, the present invention relates to a photographic image reproduction apparatus which forms a photographic image on a photographic light-sensitive material for printing from electronic image information.

It is commonly known that conventional imaging for obtaining the electronic image information takes a short time. However, conventional imaging for obtaining the electronic image information can only obtain electronic image information of low resolution. Therefore, imaging and reproduction from the electronic image information were conducted synchronously. In addition, it is also commonly known that the image quality of reproduced images is better when a photographic image having high resolution is picked up.

In addition, it is commonly known to use a sheet type photographic light-sensitive material for printing wherein a light-sensitive material is cut to one frame of reproduced size, as the photographic light-sensitive material for printing used for the photographic image reproduction apparatus which forms the photographic image on the photographic light-sensitive material from the electronic image information.

However, different from conventional technologies, it was discovered that it takes an excessively long time for imaging the photographic image having high resolution (a high resolution image is ordinarily 1 million pixels or more, specifically, and can be up to 5 million pixels or more). In addition, it is also commonly known that reproduction from the electronic image information requires a short time even when its resolution is high.

In addition, when the photographic light-sensitive material for printing which forms the photographic image is in a web form, it is necessary to provide a non-printing portion for conveyance at the front end and rear end. Therefore, when the photographic image is printed on the photographic light-sensitive material for printing for a relatively small number, not reaching a prescribed amount, the cutting operation becomes proportionally large for covering such small numbers. Accordingly, it turns out that productivity is decreased and that much waste of the photographic light-sensitive material for printing occurs.

In addition, as explained above, imaging of the photographic image having high resolution requires a relatively long time. On the contrary, reproduction, by means of a CRT reproduction means, from the electronic image information needs relatively less time. Therefore, when synchronizing these, some waste of time occurs with the CRT reproduction means. In addition, with regard to the CRT main body, it takes a considerable time from when the power supply is turned ON until an image is stabilized and the photographic image is reproduced. Therefore, when the power supply is turned ON and the photographic image is reproduced for only one frame or a small number of frames, productivity as a whole suffers. In addition, when the power supply for the CRT main body remains ON, electric power is wasted.

In addition, the present invention relates to an image processing apparatus which produces displayed electronic image information and also produces reproduced electronic image information.

Conventionally, the image processing apparatus has a storing memory which stores electronic image information inputted into the image processing apparatus and, separated from this, a storing memory for the displayed electronic image information which is inputted into an image displaying monitor.

In addition, conventionally, the image processing apparatus has a storing memory which stores electronic image information to be processed by the image processing apparatus and, separated from this, a storing memory for the reproduced electronic image information which is outputted to a reproduction means.

However, a large capacity of memory is necessary to store the photographic image of high resolution (high resolution images of ordinarily 1 million pixels or more, specifically, and can be up to of 5 million pixels or more).

SUMMARY OF THE INVENTION

A first object of the present invention is to accurately reproduce the position relationship of the image formation points of each color after image-shifting and to obtain an image with high quality by smaller times of image-shifting.

Therefore, an embodiment for attaining the first object is a photographic original imaging apparatus which picks up the photographic image of the photographic original for plural colors having an imaging means comprised of many pixels arranged in a prescribed arrangement which can pick up any colors of the above-mentioned plural colors, an image shifting means which shifts an image formation position of the photographic image of the photographic original of the above-mentioned imaging means by a distance shorter than a distance between two pixels of the imaging means, a filter selecting means which selects a color filter to determine an imaging color of the above-mentioned imaging means from plural colors of color filters, and characterized by alternately repeating imaging the photographic image of the photographic original of the relevant imaging color by means of the above-mentioned imaging means while changing color filters which determine an imaging color of the above-mentioned imaging means for the plural colors by means of the above-mentioned filter selecting means and shifting the formed position of the photographic image of the photographic original due to the imaging means by the distance shorter than the length between two pixels of the imaging means.

Here, "imaging by means of an image shifting method" is defined to pick up an image sequentially while shifting the image formation position by a distance shorter than a distance or length between two pixels of an imaging means. It goes without saying that to pick up by shifting (integer multiplication of a length between two pixels)+(A distance shorter than the length between two pixels) results in the same effects except for the imaging edge portion. Therefore, (integer multiplication of the pixel spacing)+(A distance shorter than the pixel distance) is included in "to shift an image formation position of the photographic image of the photographic original of the imaging means by a distance shorter than a length between two pixels of the imaging means". When the integer referred to as here is smaller than the pixel number in a shifting direction, the effects may result in. However, it is ordinarily ½ time or less, preferably ⅟₁₀ time or less and specifically preferably ⅟₁₀₀ time or less than the pixel number. For shifting the image formation position, the following methods are cited. The first method is to shift the position of the imaging mean itself. The second method is to provide a imaging lens means and parallel plate glasses in front of the imaging means and to incline this parallel plate glasses for shifting the image formation position of the imaging means. The third method is to provide a mirror in front of the imaging means and to shift the angle of the mirror. This image shift method is a preferable method since imaging with high resolution and high quality having high reproducibility can be conducted, though an imaging element used is inexpensive.

Incidentally, "an imaging means which can pick up any of plural colors" means that the imaging means has the sensitivity to any of plural colors so that it can pick up them.

A second object of the present invention is to provide an image shift type imaging apparatus which can change inputted image quality and imaging time selectively depending upon applications wherein it may take for a long time though resolution is high and applications wherein resolution may be poor though it takes only a short time.

Accordingly, its embodiment is an photographic original imaging apparatus having an imaging means, which picks up the photographic image of a photographic original, comprised of many pixels which are arranged in a prescribed manner and an image shift means which shifts the image formation position of the photographic image of the photographic original of the imaging means by a distance shorter than the pixel spacing of the imaging means, wherein the amount of shifting the image formation position by means of the image shift means can be changed.

A third object of the present invention is to determine appropriate exposure by one time of imaging operation.

Accordingly, the embodiment is an photographic original imaging apparatus having an imaging means, comprised of many pixels arranged in a prescribed manner, which can pick up any of the above-mentioned plural colors, a filter selection means which selects a color filter which determines the imaging color of the imaging means or a filter for determining exposure, from several color filters for plural colors and filters for determining exposure which sets the imaging color of the imaging means to a color for determining exposure and an imaging exposure conditions determining means which determines exposure conditions when imaging for plural colors, based on image information picked up by means of the imaging means when the filter for determining exposure is selected by means of the filter selection means, wherein the photographic image of the photographic original is picked up for plural colors after exposure is determined.

A fourth object is to pick up under not greatly different conditions from an appropriate conditions and little time is required for determining exposure.

Accordingly, its embodiment is a photographic original imaging device which picks up the photographic image of the photographic original for plural colors after determining exposure having an imaging means, comprised of many pixels arranged in a prescribed arrangement, which can pick up any of the plural colors, an image shift means which shifts the image formation position of the photographic image of the photographic original taken by the imaging means by a distance shorter than a pixel spacing of the imaging means, a filter selection means which selects a color filter determining the picked up color of the imaging means or a filter for determining exposure from color filters respectively having plural colors and filters for determining exposure for setting the picked up color of the imaging means to a color for determining exposure and an imaging exposure conditions determining means which determines exposure conditions when plural colors are picked up based on image information picked up by means of the imaging means when the filter for determining exposure is selected by means of the filter selection means, wherein, after exposure conditions for imaging for plural colors are determined by means of the above-mentioned imaging exposure conditions determining means, to pick up the photographic image of the photographic original of specific image-formed color by means of the above-mentioned imaging means and to shift an image formation position of the photographic image of the photographic original of the above-mentioned imaging means by a distance shorter than the pixel spacing of the imaging means are repeated sequentially while color filters for determining the picked up color of the imaging means are sequentially changed for the plural colors by means of the filter selection means.

A fifth object of the present invention is to be able to control exposure by measuring appropriate exposure conditions by single exposure and to control exposure for higher accuracy.

Accordingly, its embodiment is a photographic original imaging device which picks up the photographic image of the photographic original for plural colors after determining exposure having an imaging means, comprised of many pixels arranged in a prescribed arrangement, which can picks up any color of the above-mentioned plural colors, an image shift means which shifts image formation position of the photographic image of the photographic original by the above-mentioned imaging means by a distance shorter than a pixel spacing of the imaging means, a filter selection means which selects a color filter determining the picked up color by the above-mentioned imaging means or a filter for determining exposure from color filters with plural colors respectively and filters for determining exposure for setting the picked up color by the above-mentioned imaging means to a color for determining exposure, an imaging exposure conditions determining means which determines exposure conditions when plural colors are picked up based on image information which was picked up by means of the above-mentioned imaging means when the above-mentioned filter for determining exposure is selected by means of the above-mentioned filter selection means and a control means which controls the above-mentioned imaging means, the above-mentioned image shift means, the above-mentioned filter selection means and the above-mentioned imaging exposure conditions determining means, wherein the above-mentioned control means selectively executes the first control mode which conducts the following procedure ① after determining exposure conditions when plural colors are picked up by means of the above-mentioned imaging exposure conditions determining means and the second control mode which conducts the following procedure ②.

Procedure ① is to sequentially repeat a cycle composed of the first process wherein a photographic image of the photographic original of relevant imaging color is picked up by means of the above-mentioned imaging means, while a color filter which determines the color picked up by the above-mentioned imaging means for the above-mentioned plural colors by means of the above-mentioned filter selection means and the second process wherein an image formation position of the photographic image of the photographic original taken by the above-mentioned imaging means is shifted by a distance shorter than the pixel spacing of the imaging means by means of the above-mentioned image shift means.

Procedure ② is to sequentially repeat a cycle composed of the first process which determines exposure conditions, when plural colors are picked up, by means of the above-mentioned imaging exposure conditions determining means, the second process which picks up the photographic image of the photographic original of specific picked up color by means of the above-mentioned imaging means, while a color filter which determines the picked up colors by the above-mentioned imaging means for the above-mentioned plural colors is sequentially changed by means of the above-mentioned filter selection means and the third process which shifts the image formation position of the photographic image of the photographic original by the above-mentioned imaging means by a distance shorter than the pixel distance of the imaging means by means of the above-mentioned image shifting means.

A sixth object is to provide a photographic original imaging apparatus which can pick up both of a two-dimensional photographic original and a three-dimensional object.

Accordingly, its embodiment is a photographic original imaging apparatus equipped with a light source for imaging, a photographic original supporting means, located on an imaging optical axis, which supports a photographic original, an original unit supporting frame which supports a light source for the above-mentioned imaging and the above-mentioned photographic original supporting means and a frame which supports the above-mentioned original unit supporting frame detachably and which also supports the above-mentioned photographic original imaging means and the above-mentioned imaging lens, wherein focus position of the above-mentioned photographic original imaging means is replaceable and imaging is capable when the above-mentioned original unit supporting frame is detached from the above-mentioned frame.

A seventh object is to simplify replacement of the light source for imaging in a photographic original imaging apparatus which has a light source for imaging capable of imaging by the use of image shift, while satisfying accuracy required between a imaging lens means, an image shift means and a photographic original imaging means.

Accordingly, its embodiment is a photographic original imaging apparatus characterized by equipping with a light source for imaging, a photographic original supporting means, located on the imaging optical axis, which supports the photographic original, a photographic original imaging mean, comprised of many pixels which are arranged in a prescribed matrix, which picks up the photographic image of the photographic original supported by the above-mentioned photographic original supporting means, a imaging lens means, located on the imaging optical axis, which image-forms the photographic image onto the above-mentioned photographic original imaging means, an image shifting means which shifts the image formation position of the photographic image of the photographic original by means of the above-mentioned photographic original imaging means by a distance shorter than the pixel spacing of the imaging means, an original supporting frame which supports the above-mentioned light source for imaging and the above-mentioned photographic original supporting means and a frame which supports the above-mentioned original supporting frame detachable and a frame which supports the above-mentioned photographic original imaging means, the above-mentioned imaging lens means and the above-mentioned image shift means.

An 8th object of the present invention is to prevent internal reflection of inputted light by means of a color filter and to pick up an image at desirable image quality.

Accordingly, its embodiment is a photographic original imaging apparatus having a photographic original imaging means which picks up the photographic image of the photographic original, a imaging lens means, located on the imaging optical axis, which image-forms the photographic image of the photographic original onto the above-mentioned photographic original imaging means and a color filter, located on the imaging optical axis between the photographic original and the above-mentioned photographic original imaging means, which determines picked up color by the above-mentioned imaging means, wherein the above-mentioned color filters are positioned inclining to the vertical surface to the imaging optical axis or has a concave shape to the photographic original side and intersecting the imaging optical axis.

A 9th object of the present invention is to prevent the occurrence of wasted time on the CRT reproduction means side while reproduction wherein an image is stable and electric power consumption saving can be attained at the same time, and as a whole, an overall improvement in productivity can be realized.

Accordingly, its embodiment is as follows.

A photographic image reproduction apparatus characterized in having a storing means which stores electronic image information, a CRT reproduction means which reproduces photographic images on a photographic light-sensitive material for printing by means of the CRT from electronic image information stored in the above-mentioned storing means, wherein the above-mentioned CRT reproduction means continuously reproduces photographic images when the electronic image information, to be reproduced by the above-mentioned CRT reproduction means, which was stored by the above-mentioned storing means has reached a prescribed amount.

In addition, "when the above-mentioned electronic image information is electronic image information of the photographic image which was picked up by means of a photographic image imaging means which picks up by means of the above-mentioned image shift method", imaging of the photographic image is conducted with high resolution. However, compared to reproduction, imaging requires longer time. Therefore, the present invention is useful.

In addition, the second embodiment is the photographic image reproduction apparatus described in the first embodiment described earlier, wherein the above-mentioned storing means is a non-transportable storing means structured integrally with the present apparatus unremovably.

Due to this, since busses which transfer electronic image information are firmly connected between the above-mentioned storing means and the above-mentioned CRT reproduction means, an operation to connect busses which transfers the electronic image information, such as a floppy disc is integral to a disc drive, is not necessary. In addition, a buss which transfers at low speed such as between the floppy disc and the disc drive is not necessary. The above-mentioned storing means and the above-mentioned CRT reproduction means can be connected only by means of a buss capable of transferring at high speed. Therefore, reading from the storing means when reproduction is conducted can be conducted speedily. As a non-transportable storing means, a storing memory, a hard disc and a silicon disc (semi-conductor memory with high capacity) are cited.

There are occasions when an image which was reproduced is reproduced later again. Accordingly, the third embodiment is the photographic image reproduction apparatus of the first embodiment, wherein the above-mentioned storing means has an electronic image information recording means in which electronic image information of the photographic image which is reproduced by the above-mentioned reproduction means is recorded on an integral transportable recording medium and an electronic image information reading means which reads the electronic image information which was stored in an integral transportable storing medium.

Incidentally, the transportable recording medium is a recording medium which records electronic image information capable of being installed in an apparatus, detached from the apparatus and transported. The transportable recording medium includes magnetic discs such as a mini-magnetic disc and a floppy disc, a light magnetic disc and a semi-conductor memory card.

The 10th object of the present invention is to prevent the occurrence of excessive wasted time on a photographic light-sensitive material for printing, without reducing productivity, even when the photographic light-sensitive material for printing which forms the photographic image is in a web form.

Accordingly, its first embodiment is a photographic image reproduction apparatus having a storing means which stores the electronic image information and a reproduction means which reproduces the photographic image onto the photographic light-sensitive material for printing, which is transported by means of a transporting means, from the electronic image information stored by means of the above-mentioned storing means, wherein the above-mentioned reproduction means consecutively reproduces the photographic image onto the photographic light-sensitive material for printing, while the photographic light-sensitive material is transported by means of the above-mentioned transporting means, when the electronic image information, to be reproduced by means of the above-mentioned reproduction means, which was stored by the above-mentioned storing means reaches a prescribed amount.

The second embodiment is the photographic image reproduction apparatus described in the first embodiment wherein the above-mentioned storing means is a non-transportable storing means integrally structured with the main body not detachable.

The third embodiment is the photographic image reproduction apparatus described in the first embodiment having an electronic image information recording means which records the electronic image information of the electronic image, which is reproduced by means of the above-mentioned reproduction means on an integral transportable recording medium and an electronic image information reading means which reads the electronic image information which was stored in the integral transportable storing medium.

The 11th object of the present invention is to reduce wasted time which occurs on the reproduction means side.

Accordingly, its embodiment is a photographic image reproduction apparatus having a photographic image imaging means which picks up the photographic image of the photographic original, a non-transportable storing means, which stores the electronic image information of the photographic image picked up by means of the above-mentioned photographic image imaging means, integrally structured with the main body and is not removable, an electronic image information recording means which records the electronic image information of the photographic image, which is picked up by means of the above-mentioned photographic image imaging means, in an integral transportable image recording medium, an electronic image information reading means which reads the electronic image information stored in an integral transportable storing medium, a selection means which selects the electronic image information stored by means of the above-mentioned non-transportable storing means or the electronic image information which was stored in an integral transportable storing medium by means of the above-mentioned electronic image information reading means and a reproduction means which reproduces the photographic image on the photographic light-sensitive material for printing from the electronic image information which was selected from the above-mentioned selecting means.

The 12th object of the present invention is to minimize wasted time which occurs on a photographic image reproduction apparatus side.

Its first embodiment is a photographic image reproduction device having a photographic image imaging device connection unit for connecting with a photographic image imaging device which picks up the photographic image of the photographic original, an image processing means which image-processes the electronic image information of the photographic image which was picked up by means of the above-mentioned photographic image imaging device and a reproduction means which reproduces the photographic image, by means of the CRT, on the photographic light-sensitive material from the electronic image information of the photographic image which was processed by means of the above-mentioned image processing means, wherein the above-mentioned photographic image imaging device connection unit can be connected to plural photographic image imaging device.

Its second embodiment is a photographic image reproduction device having an image processing device connection unit which connects to an image processing device which image-processes the electronic image information, a reproduction means which reproduces the photographic image, by means of the CRT, on the photographic light-sensitive material for printing from the electronic image information of the photographic image which was processed by means of the above-mentioned image processing device, wherein the above-mentioned image processing device connection unit can be connected to plural image processing device.

The 13th object of the present invention is to provide an image processing device whose memory used amount is small wherein a storing memory stores a displayed electronic image information.

The 14th object of the present invention is to provide an image processing device whose memory used amount is small wherein the image processing device does not store reproduced electronic image information.

The image processing device whose memory used amount is small wherein a storing memory stores a display electronic image information is attained by the following constitution.

The first embodiment for attaining the 13th object is an image processing device having an inputting unit of the electronic image information of the photographic image, a storing memory which stores the electronic image information inputted from the above-mentioned inputting unit and a displayed image information producing means which produces displayed electronic image information inputted in the above-mentioned display means from the above-mentioned electronic image information, wherein the above-mentioned storing memory stores the displayed electronic image information produced by means of the above-mentioned displayed image information producing means.

In addition, due to that "the above-mentioned photographic image is the electronic image information outputted by the photographic image imaging means which picks up by means of the image shift method", the electronic image information outputted by the photographic image imaging means which picks up by means of the image shift method is the electronic image information of the photographic electronic image whose resolution is especially high. Therefore, its information amount is higher than conventional electronic image information. Accordingly, the present invention is useful.

The second embodiment is to have an image processing unit whose image-processes the electronic image information inputted from the above-mentioned inputting unit or the electronic image information stored in the above-mentioned storing memory and that the above-mentioned storing memory stores also the electronic image information processed by the above-mentioned image processing unit.

An embodiment for attaining the 14th object is an image processing device having an image processing unit which image-processes the photographic image information of the photographic image, a storing memory which stores the electronic image information processed by means of the above-mentioned image processing unit, reproduction means connection unit which connects to the reproduction means and a reproduced image information producing means which produces reproduced electronic image information outputted to the above-mentioned reproduction means, wherein the reproduced electronic image information produced by the above-mentioned reproduction image information producing means is, while not stored, sent to the above-mentioned reproduction means from the above-mentioned reproduction means connection unit.

In addition, when the above-mentioned reproduced image information producing means produces the reproduced electronic image information by integer-multiplying the original electronic image information vertically and laterally, the information amount of the resulting reproduced electronic image information is larger. Therefore, it is useful. Specifically, when it is expanded by two or more times vertically and laterally, it is especially useful.

Figure 1:
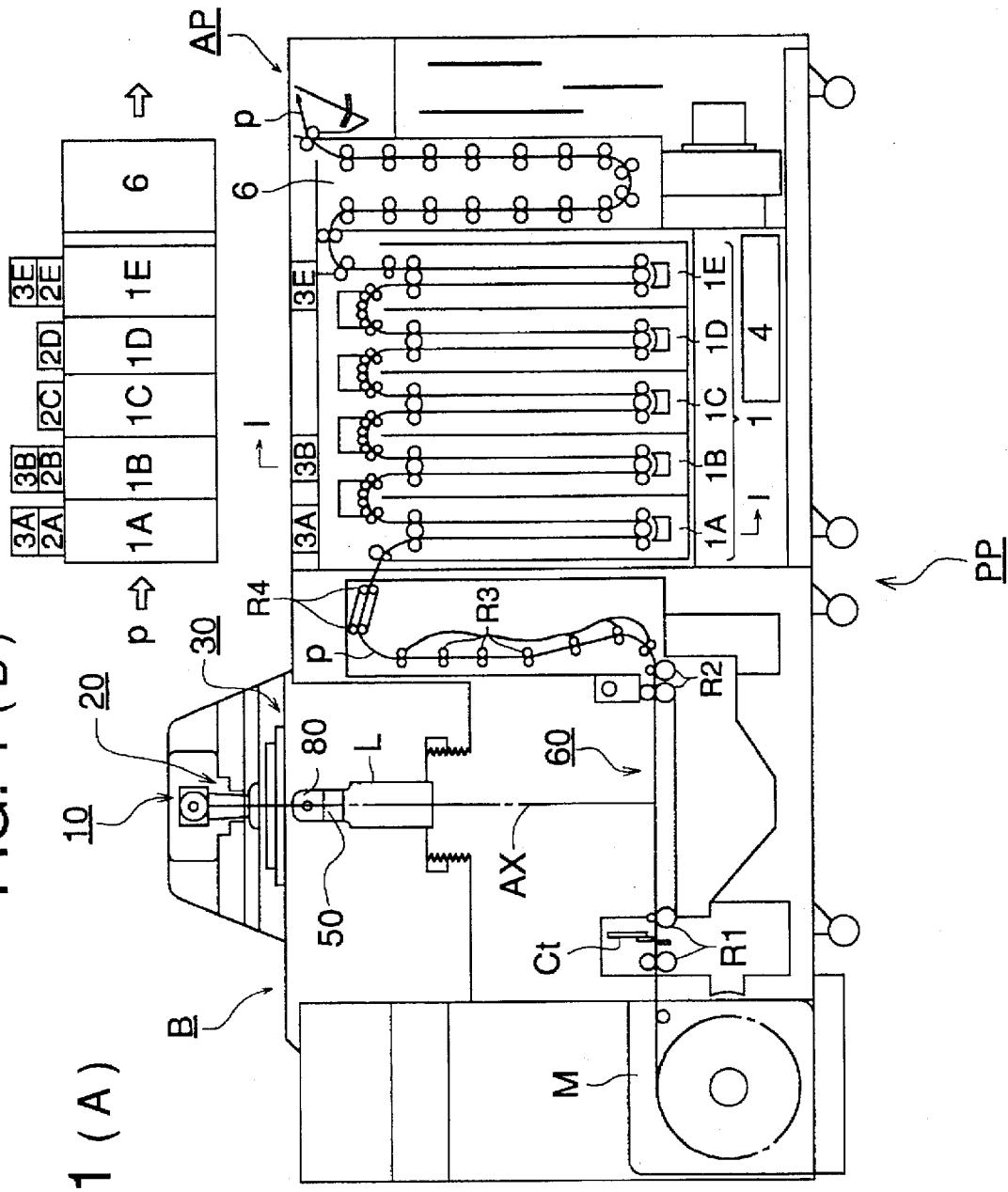
FIG. 1(A) and 1(B) are schematic diagrams of automatic printer B and automatic processing machine AP of Example 1.

DETAILED DESCRIPTION OF THE INVENTION image information is information wherein an image is translated into a signal. A photographic image is a durable image, formed on a support by means of an irradiation beam such as visible light.

A photographic light-sensitive material includes a photographic paper wherein a paper is a support .and a photographic film wherein a film base is a support. In addition, as a photographic light-sensitive material, a silver halide photographic light-sensitive material is preferable, because it is highly sensitive and it is excellent in terms of gradation reproducibility. In addition, a silver halide color photographic light-sensitive material is preferable, because it is excellent in terms of color reproducibility.

To reproduce refers to form the photographic image from the electronic image information. Reproduction includes a CRT reproduction wherein the photographic image is formed from the electronic image information and a laser reproduction wherein the photographic image is formed from the electronic image information by means of scanning of laser beam.

To print means to form the photographic image by exposing the photographic image of the photographic original onto a photographic light-sensitive material for printing. Printing includes projection printing wherein the photographic image of the photographic original is projected onto the photographic light-sensitive material for printing and exposed to light and scanning printing wherein the photographic image of the photographic original is scanned onto the photographic light-sensitive material for printing, and then, exposed to light. Projection printing includes a strictly-defined projection printing wherein the photographic image of the photographic original is image-formed and projected, and then, exposed to light and contact printing wherein the photographic original and the photographic light-sensitive material for printing are brought into contact with each other. For the photographic light-sensitive material for printing, a photographic paper is ordinarily used. However, a photographic film and a photographic light-sensitive glass plate may also be used.

Original is a medium which records the original image or image information for copying to the photographic image. Original includes the photographic original which records the original image for copying to the photographic image in a form of photography and an electronic original which records the original image for copying to the photographic image in a form of the electronic image information. In addition, the photographic original includes a monochrome photographic original which records the original image for copying to the photographic image in a form of monochrome photography and a color photographic original which records the original image for copying to the photographic image in a form of color photography. In addition, the photographic original includes a transmitting original wherein a photographic image is formed on a transparent film such as a developed photographic film and a glass and a reflective original wherein the photographic image is formed on a opaque support such as paper. As a color photographic original, a color film, wherein plural uniform light-sensitive layer is formed on a transparent film support, which was subjected to photographic processing after latent images were produced due to imaging. As a color photographic original, not only a developed silver halide color photographic light-sensitive film, but also a developed silver halide color photographic light-sensitive glass dry plate and a color photographic film wherein a sublimation type thermal transfer image-receiving sheet image-receives a sublimation dye. In addition, the original records an original image of one frame. However, many originals record the original image of plural frames.

A lens means is a means for scattering or converging light beam such as a lens and a concave and convex mirror.

As a displaying means, a CRT which forms images on a CRT screen by irradiating beam, capable of being controlled, on the CRT screen from the electronic image information and an image displaying monitor such as a liquid crystal monitor forming images on a liquid crystal screen are preferably cited.

A color filter is a filter having different transmittance depending upon wavelength. It includes those provided with optical parallel plainness and also includes those not provided. In addition to a sharp cutting filter, an LB filter and a CC filter are cited.

DETAILED DESCRIPTION OF THE PREFERRED EMBODIMENTS

Figure 2:
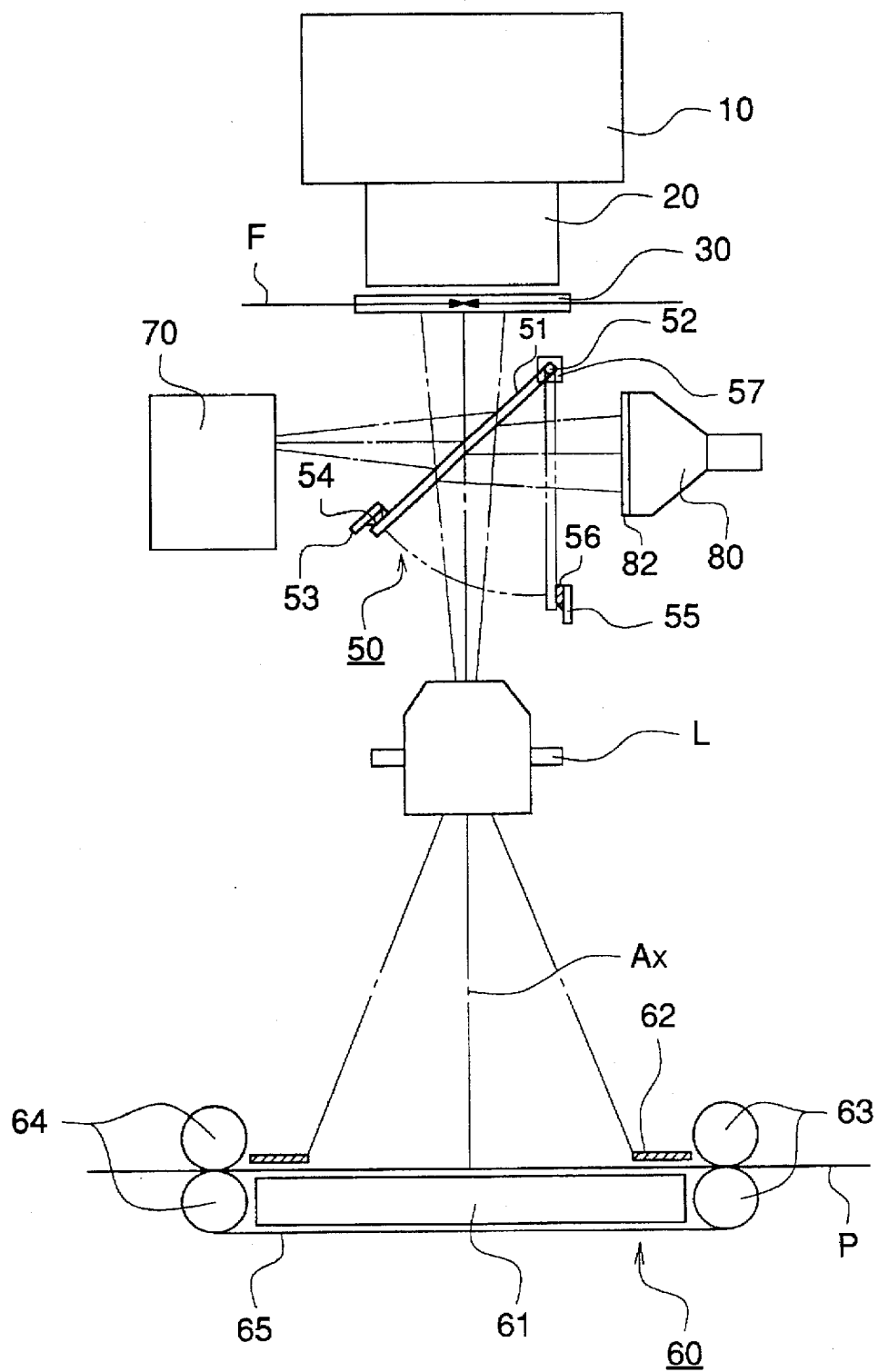
FIG. 2 is a diagram of a printer unit of an automatic printer of Example 1.

FIG. 1 is a schematic diagram of an automatic printer B and an automatic processing machine AP of the present invention. In FIGS. 1 and 2, photographic papers P are conveyed from left to right. The automatic printer of the present example employs a developed silver halide photographic light-sensitive film (hereinafter, referred to a simply as color film) having plural frames each having a color photographic image of a photographic original and which is a transmitting the original and the sheet type photographic paper which are of a silver halide color photographic light-sensitive material, as a photographic light-sensitive material for printing.

First of all, the exposure light path of the automatic printer B in FIG. 2 will be explained. The exposure optical axis Ax of automatic printer B is vertical. Light from lamp house 10 of the automatic printer B illuminates a color film supported by negative film carrier 30 which is the photographic original supporting means holding a photographic original, through diffusion box 20 which is a means for making the surface light source which makes point light source to the uniform surface light source.

Below negative film carrier 30, there is provided zoom lens L, with a built-in aperture and a shutter, which is a printer lens means. Zoom lens L is used for projecting the image on the color film frame with a negative film mask 31 and forming the image on a sheet type photographic paper. The extension ratio of this zoom lens L projecting the image on the frame onto the negative film carrier 30 to the sheet type photographic paper is variable. In addition, the aperture and the shutter are built into the zoom lens L so that the aperture is adjusted based on an aperture controlling signal from control unit 110 and the shutter is opened/closed based on a shutter operation control signal. Due to these functions, light exposure axis Ax is opened/closed so that exposure time is controlled. The image formation plane by this zoom lens is the plane wherein the curvature is so inconsequential that influence by the curvature is substantially ignored.

Below zoom lens L, there is provided a photographic paper supporting means which supports photographic paper P at the image formation position of zoom lens L. The photographic paper holding means 60 is composed of paper mask 62, absorption stand 61, paired photographic paper conveyance driving rollers 63 and 64 and photographic paper absorption conveyance belt 65. On the light source side of photographic paper absorption conveyance belt 65, there is provided paper mask 62. Paper mask 62 is used for directly restricting the scope of face of the photographic image which is printed onto the sheet type photographic paper. Paper mask 62 changes the scope of face in accordance with a paper mask controlling signal from control unit 110. In addition, at both ends of the photographic paper conveyance direction of paper mask 62, there is provided photographic paper absorption conveyance belt 65 which is stretched between paired photographic paper conveyance driving rollers 63 and 64, which is a conveyance means for the sheet type photographic paper and, on the opposite side, the lower rollers of paired photographic paper conveyance driving rollers 63 and 64 are synchronously driven in synchronous with photographic paper conveyance driving roller pair 63 and 64. The paired photographic paper conveyance driving rollers 63 and 64 and photographic paper absorption conveyance belt 65 are driven by the photographic paper conveyance driving motor, not illustrated, based on a photographic paper conveyance signal from control unit 110. Photographic paper absorption conveyance belt 65 pulls the sheet type photographic paper onto itself due to the evacuated absorption stand 61, and thereby conveys the paper. Since the surface of absorption stand 61 on the light source side is aligned with, the sheet type photographic paper, photographic paper absorption conveyance belt 65 and absorption stand 61 are in tight contact during printing due to the intense strong vacuum so that the focus of the image formation is improved. The sheet type photographic paper is, after exposure, conveyed to the automatic processing machine by means of paired photographic paper conveyance driving rollers 63 and 64 and photographic paper absorption conveyance belt 65, and then, subjected to photographic processing in the automatic processing machine.

Below negative film carrier 30 and above zoom lens L, there is provided a double surfaced mirror means 50. Double surfaced mirror means 50 provides double surfaced (two reflecting) mirror 51 at 45° to exposure optical axis Ax in the exposure light Path between negative film carrier 30 and zoom lens L or allows double surfaced mirror 51 to be moved out of the exposure light path. Double surfaced mirror 51 is supported by a double surfaced mirror supporting axis 57 at one end by means of pivot pin 52 which is rotated by means of a double surfaced mirror rotating and driving means, not illustrated. At the other end of double surfaced mirror 51, an iron plate (a ferromagnetic body) is placed. When double surfaced mirror 51 is angled at 45° to exposure optical axis Ax in the exposure light path, the other end of double surfaced mirror 51 is brought into contact with cushion member 54. This cushion member 54 is fixed and support by cushion member supporting means 53 which is made of an electro-magnet. When double surfaced mirror 51 is moved out of the exposure light path, the other end of double surfaced mirror 51 is brought into contact with cushion member 56 which is positioned outside the exposure light path below rotation pin 52. This cushion member 56 is fixed and supported by cushion member supporting means 53 which is made of an electro-magnet. These electro-magnets and the double surfaced mirror rotating and driving means are controlled by a mirror controlling means, not illustrated, based on controlling by means of control unit 110.

Hereinafter, arrangement relationship of each means when double surfaced mirror 51 is positioned at 45° to the exposure optical axis Ax in the exposure light path between negative film carrier 30 and zoom lens L will be explained. At the horizontal position from an intersection point of double surfaced mirror 51 and the exposure optical axis Ax where the reflected light of the frame image of the color film illuminated by double surfaced mirror 51 reaches, photographic image imaging means 70 is provided. Lens optical axis of imaging lens means 72 and the normal line of the imaging surface (the surface of solid imaging element 71) of photographic image imaging means 70 coincide the reflection optical axis of the exposure optical axis on double surfaced mirror 51 from the photographic original. In addition, there is provided CRT 80 for reproduction is positioned at the horizontal position from an intersection point of double surfaced mirror 51 and the exposure optical axis Ax, and also positioned at a position wherein the length of the exposure optical axis Ax from the color film supported by negative film carrier 30 to double surfaced mirror 51 is equal to the length from CRT 80 for reproduction to the above-mentioned reflection optical axis. In addition, the normal line of CRT screen 82 of CRT 80 for reproduction coincide with the reflection optical axis of the exposure optical axis Ax at the lower surface of double surfaced mirror 51 to the photographic light-sensitive material for printing.

When double surfaced mirror 51 is positioned at 45° to the exposure optical axis Ax in the exposure light path between negative film carrier 30 and zoom lens L due to the operation of double surfaced mirror means 50, photographic image imaging means 70 picks up the reflected light of the photographic image of the color film frame from double surfaced mirror 51. In addition, zoom lens L with the built-in aperture and shutter image-forms the reflected light of the photographic image formed on CRT screen 82 of CRT 80 for reproduction from double surfaced mirror 51 on photographic paper P which is a photographic light-sensitive material for printing.

When both surface mirror 51 is moved out of the exposure light path due to the operation of double surfaced mirror means 50, zoom lens L, a printing lens means, with built-in aperture and shutter in image-forms the photographic image of the color film frame illuminated on photographic paper P which is a photographic light-sensitive material for printing.

Next, photographic image imaging means 70 is positioned, separate from the exposure optical axis, at a horizontal position of the double surfaced mirror which is inserted into the exposure optical axis. Photographic image imaging means 70 picks up the frame image of the color film supported by negative film carrier 30 by forming an image on solid imaging element 71. In addition, there is provided imaging lens means 72, at an intermediate of a line connecting double surfaced mirror 51 and solid imaging element 71, where the frame image of the color film on negative film mask 31 forms an image on solid imaging element 71. When imaging the frame image of the color film, double surfaced mirror 51 is inserted into the exposure optical axis. Following this, light, which transmits the color film, is reflected by double surfaced mirror 51, and then, due to imaging lens means 72, the frame image enclosed by negative film mask 31 is image-formed on solid imaging element 71. The image-receiving surface of solid imaging element 71 is perpendicular to the imaging optical axis from the above-mentioned double surfaced mirror 51 to solid imaging element 71. This solid imaging element 71 reads the frame image enclosed by negative film mask 31 and outputs an image signal.

Figure 3:
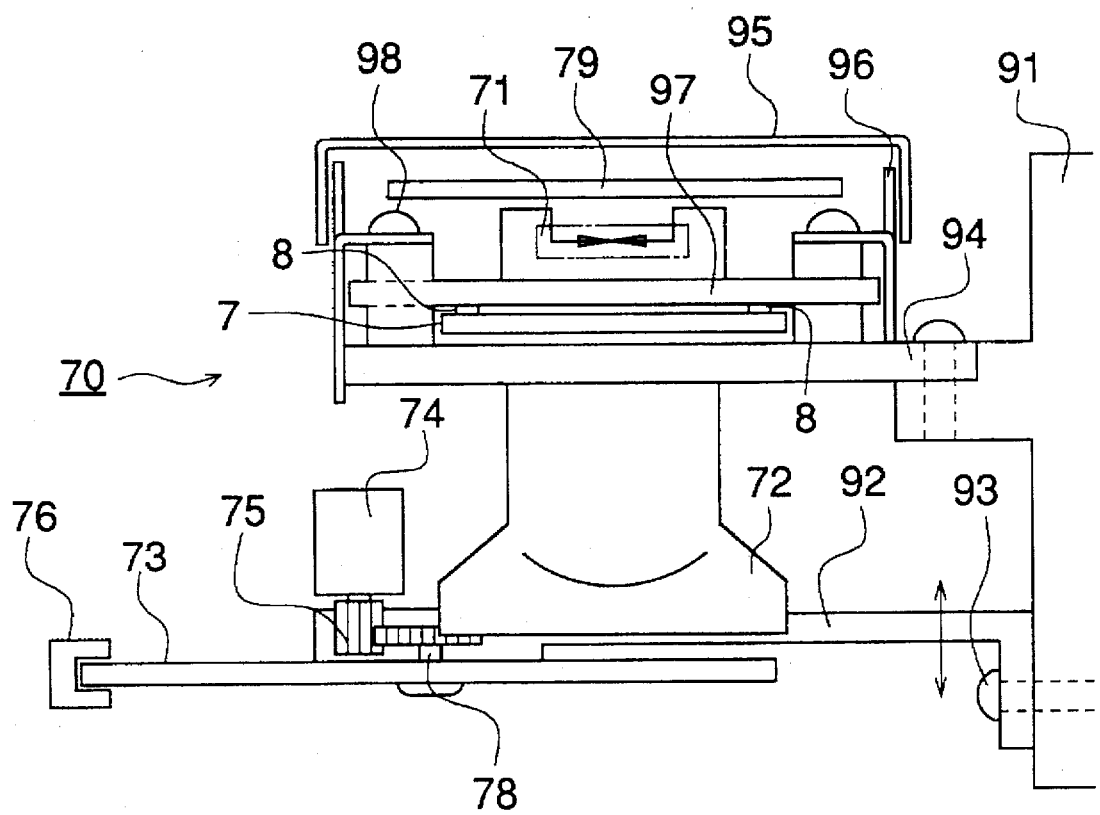
FIG. 3 is a diagram showing a structure of photographic image imaging means 70 of Example 1.

FIG. 3 shows a structure of photographic image imaging means 70. At the light-entrance side of imaging lens means 72, there is provided a color light cutting filter unit. At the light-entrance side of imaging lens means 72, there is provided a color light cutting filter supporting means 73.

Figure 4:
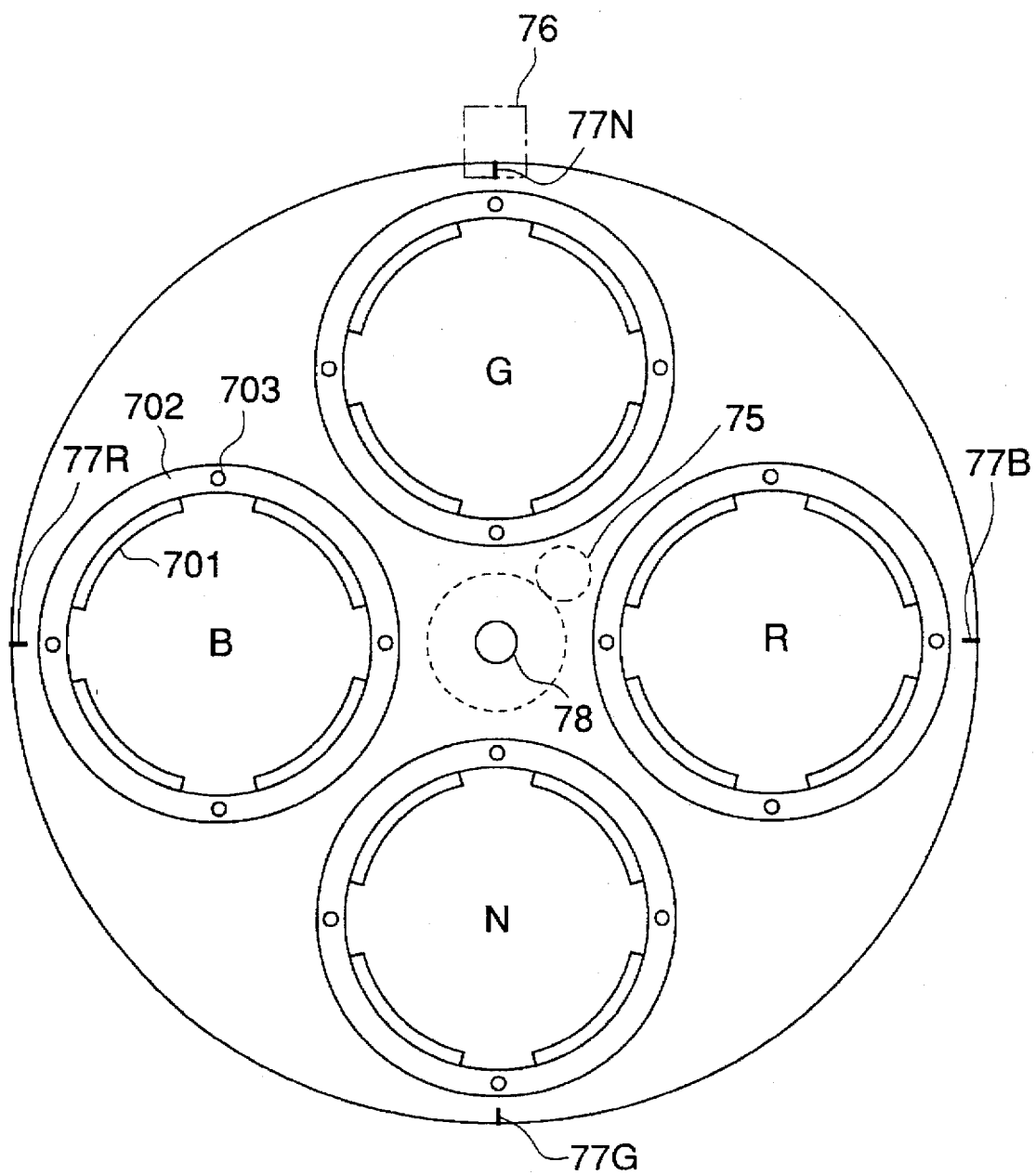
FIG. 4 is a front view of a filter supporting means of Examples 1 through 5.

The color light cutting filter unit has, as shown in FIG. 4, color light cutting filter supporting means 73, a color light cutting filter supporting means rotating and driving means which rotates and drives color light cutting filter supporting means 73 and a means for sensing rotation position of the color light cutting filter supporting means. Color light cutting filter supporting means 73 is circular. At the center thereof, there is provided central axis 78 which is a center of rotation. In color light cutting filter supporting means 73, on a smaller circle, which is smaller than color light cutting filter supporting means 73, whose center is central axis 78 which is also the central axis of color light cutting filter supporting means 73, there are provided four circles, whose size is the same each other, wherein three of them are color light cutting filters (in the figure, they are represented by B, G and R) and a filter for determining exposure, which is represented by N in the figure. Each filter is supported by filter Supporting unit 701 which supports the filter from the back of the filter and pressing plate 702 which presses the circumference of the filter. Pressing plate 702 is pressed to color light cutting filter supporting means 73 by screw 703. At the end portion of circumference of color light cutting filter supporting means 73, marks 77 (77B, 77G, 77R and 77N) for positioning, as shown in FIG. 4, are provided. By sensing these marks by means of mark sensing means, B, G and R color light cutting filters which are plural color filters and a filter for determining exposure, represented by N in the figure, are positioned. Central axis 78 integral with color light cutting filter supporting means 73 is provided with a gear. See FIG. 3. The rotating and driving means for the color light cutting filter supporting means has a gear of central axis 78 of color light cutting filter supporting means 73, engaging gear 75 and driving motor 74 which rotates and drives color light cutting filter supporting means 73 through gear 75. Due to these, color light cutting filter supporting means 73 is rotated and moved. Due to the color light cutting filter controlling signals from control unit 110, by means of a rotation and position-sensing means for a color light cutting filter supporting means and the rotating and driving means for the color light cutting filter supporting means, an appropriate color light cutting filter and the filter for determining exposure are positioned at the light entrance side of photographic lens means 72. Therefore, the rotation and position-sensing means for a color light cutting filter supporting means and the rotating and driving means for the color light cutting filter supporting means serve the role of a filter changing means. For cutting infrared rays or UV rays and for adjusting for ensuring different sensitivities of B, G and R of the solid imaging element 71, exposure is controlled when a filter for determining exposure is inserted into the imaging optical axis.

In addition, a MOS type imaging element may be used for the solid imaging element. However, a CCD is preferable from the viewpoint of inexpensive cost and effects of the present invention. In addition, an IT-CCD or a FIT-CCD each having an electronic shutter function are preferable. For example, exposure conditions may be adjusted by changing the lens aperture, instead of changing the shutter time of an electronic shutter. These may be changed as necessary.

Figure 5:
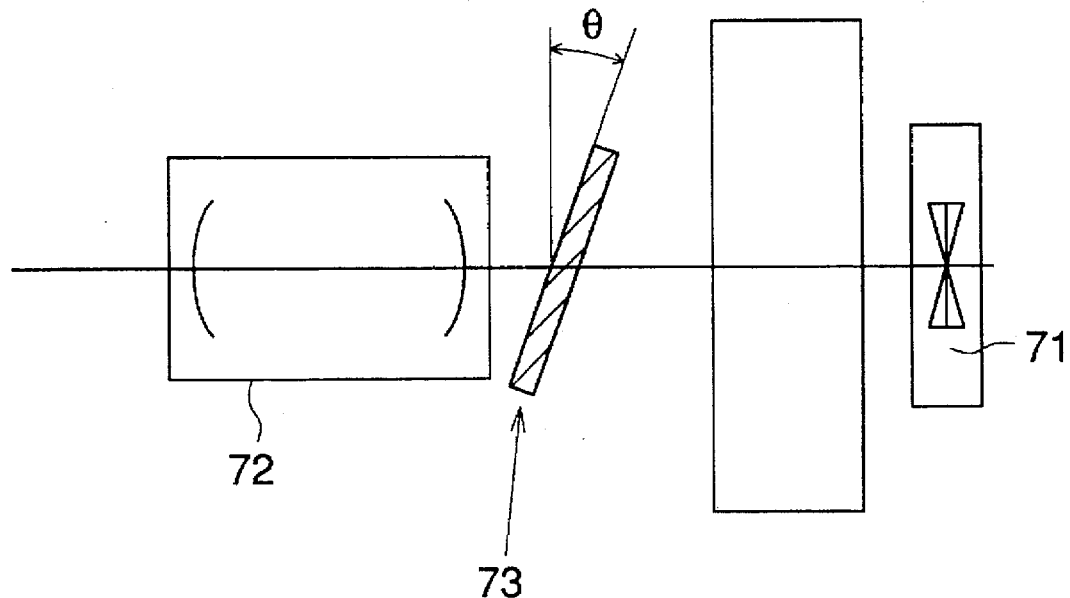
FIG. 5(A) and 5(B) are cross sectional views of filter supporting means of Examples 1 through 5.
Figure 5:
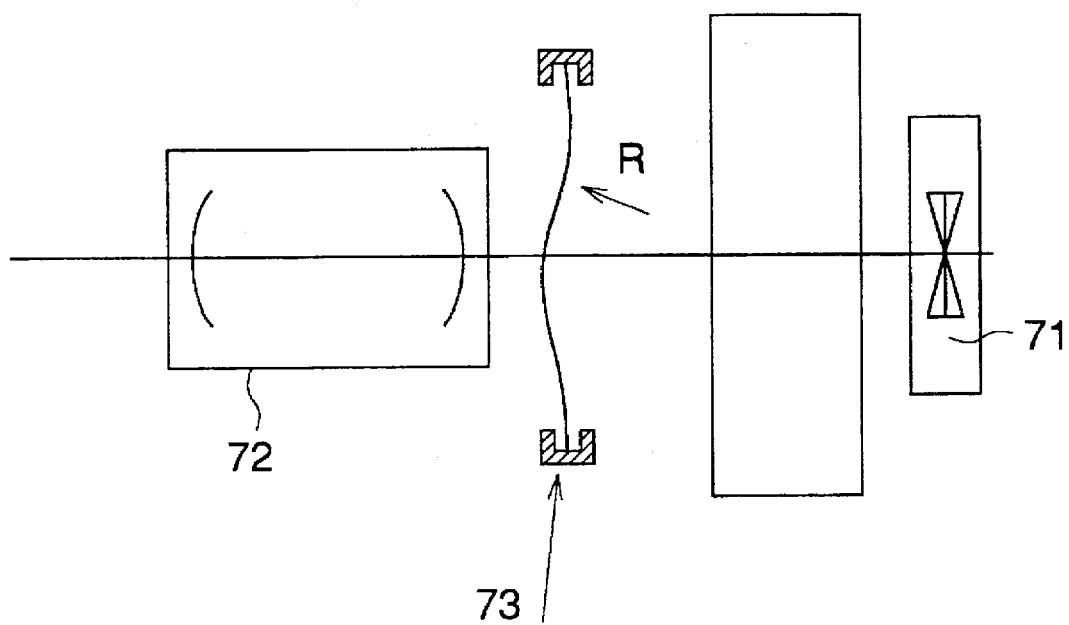

FIG. 5(A) and 5(B) show cross-sectional views of a filter. In the above FIG. 5(A), the filter has an ordinary disc shape. It is positioned having an inclination angle θ perpendicular to the optical axis. Obviously, filter supporting unit 701 and pressing plate 702 are also inclined to be positioned. Due to this, the filter is not parallel to the imaging lens means or the solid imaging element. Therefore, the reflection light is reflected to the outside of the light path so that the occurrence of internal reflection between the filter and the imaging lens means or the solid imaging element can effectively be prevented.

In addition, FIG. 5(B) shows a varied example thereof, wherein the filter is a convex shape toward the photographic original side of the imaging optical axis. Due to this, this filter also is not parallel to the imaging lens means or the solid imaging element. Therefore, the reflection light is reflected to the outside of the light path so that the occurrence of internal reflection between the filter and the imaging lens means or the solid imaging element can effectively be prevented. Incidentally, since the filters are not inclined perpendicular to the optical surface, neither filter supporting unit 701 nor pressing plate 702 are inclined.

Incidentally, the above-mentioned solid imaging element 71 is spectrally sensitive to any of the three primary colors of B, G and R. In addition, it is normal that solid imaging element 71 is also spectrally sensitive to both infrared rays and UV rays. Therefore, when exposure is controlled by means of a neutral color, infrared rays and UV rays are necessary to be cut. In addition, since sensitivity is different for each primary color of B, G and R, it is also preferable that there is a specific filter which adjusts these. Accordingly, in order to cut the infrared rays and/or the UV rays and to adjust for the different sensitivities of the three primary colors of B, G and R of solid imaging element 71, in FIG. 4, exposure is controlled when filter N for determining exposure is inserted into the imaging optical axis. In addition, in the present example and in examples 2 through 5 explained later, the solid imaging element is allowed to be a MOS type imaging element. However, the CCD is preferable in terms of inexpensive cost and the effects of the present invention. Hereunder, figures are explained keeping IT-CCD or FIT-CCD in mind. However, for example, exposure conditions may be changed by changing lens aperture, but not by changing the shutter time of the electronic shutter. These may be changed occasionally.

Photographic image imaging means 70 is supported by imaging means frame 91 which is a supporting body. Solid imaging element 71 is supported by a disc shaped solid imaging element frame 97. Electronic board 79 for solid imaging element is positioned behind solid imaging element 71. Electronic board 79 for solid imaging element is, as explained later, connected to A/D conversion unit 172 by means of wiring which transmits analog image information. It is also connected to imaging control unit 171 by means of a controlling interface. Light-shielding cylinder 96 made of metal whose interior is black is provided, as if surrounding the circumferential portion of circular solid imaging element frame 97. Light-shielding lid 95 is provided as if engaged with the above-mentioned light-shielding cylinder 96. Photographic means supporting plate 94 supports photographic lens means 72 at the solid imaging element 71 end light-tightly, and also supports circular solid imaging element frame 97 through one column. By means of light-shielding cylinder 96, light-shielding lid 95 and imaging means supporting plate 94, light only passing through imaging means 72 enters solid imaging element 71. Imaging means frame 91 firmly supports imaging means supporting plate 94. Color light cutting filter means supporting plate 92, which supports a color light cutting filter means composed of color light cutting filter supporting means 73, gear 75, driving motor 74 and mark sensing means 76, is adjustable forward/backward, against imaging means frame 91, in the arrowed direction shown in FIG. 4. After adjusting forward/backward, it is locked by bolt 93 firmly.

Images are shifted by means of parallel-surfaced plate glass plate 7 such as BK 7 provided in solid imaging element frame 97 through plural piezoelectric elements 8. Parallel-surfaced plate glass plate 7 is provided on solid imaging element 71 on the imaging lens means 72 end. By means of-image shift control unit 174, appropriate voltage is applied to plural piezoelectric elements 8 which support parallel-surfaced plate glass plate 7. As a result, a part of piezoelectric elements 8 expand, inclination of parallel plate glass plate 7 is minutely changed and the position of image formation is minutely altered.

Image may not be shifted by means of parallel plate glass plate 7 provided through piezoelectric element 8, but may be shifted by minutely inclining parallel plate glass plate 7 by means of a mechanical means or the solid imaging element itself may be shifted by means of the piezoelectric elements or the mechanical means.

Parallel plate glass plate 7 has higher track distortion on both surfaces compared to an ordinary plate glass plate. The material of glass may be quite ordinary. Specifically, glass with a high refractive index and low dispersion, color aberration can be prevented and an image with high image quality can be obtained. In this occasion, it is necessary to control the inclination accuracy of the glass plate more minutely compared to an ordinary glass material.

Figure 6:
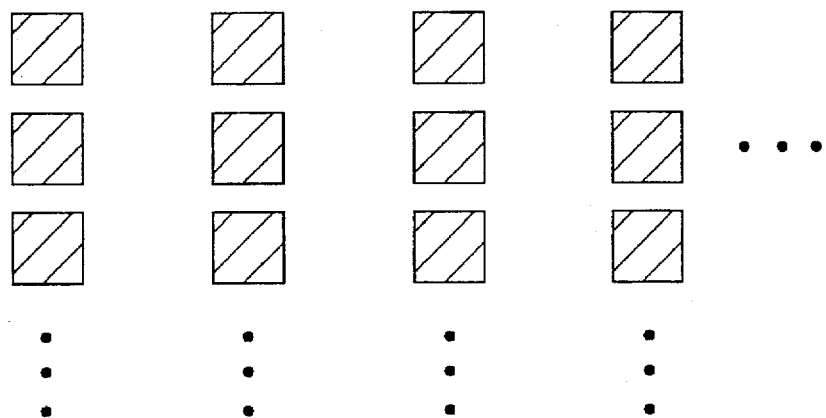
FIG. 6(A), 6(B) and 6(C) are explanation drawings of image shifting.
Figure 6:
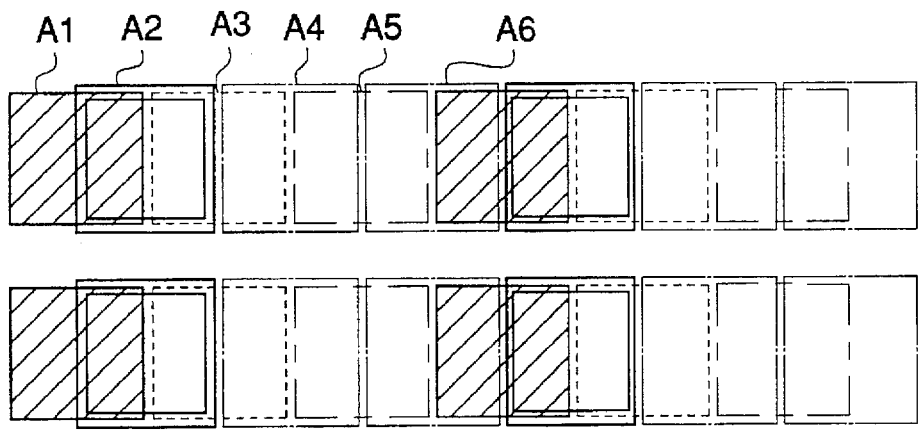
Figure 6:
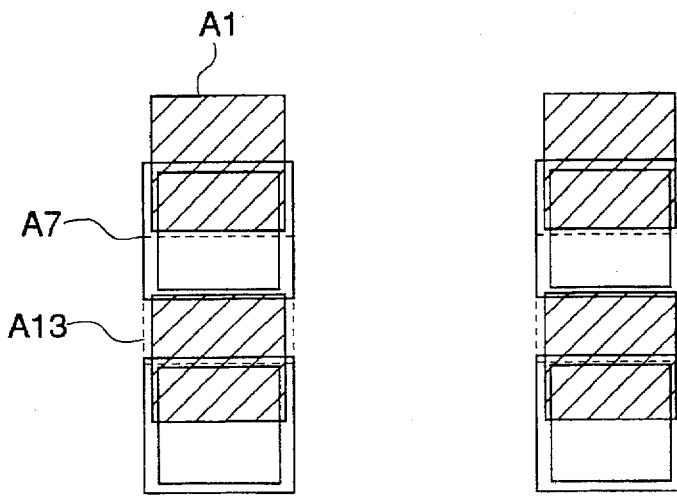

FIG. 6(A) to 6(C) are drawings for explaining image shift. Ordinarily, when focusing is completely fixed on the solid imaging element, image information of skipped regions is picked up. Namely, the solid imaging element cannot be ordinarily provided in a manner that each photo-diode is contacted. Therefore, as shown in FIG. 6(A), the photo-diodes (regions enclosed with a rectangle are photo-diodes) are spaced uniformly. Accordingly, image information of regions enclosed with objective rectangles are picked up. The solid imaging elements, having high pixel numbers are, due to manufacturing reasons, considerably expensive. In order to increase resolution while the pixel number of the solid imaging element remains the same, and in order to pick up image information between the spaced regions specific to the solid imaging element, an image is picked up by shifting the position of image formation by a distance shorter than the pixel spacing. This procedure is referred to as image shifting.

FIG. 6(B) is a drawing showing an example wherein an image formation position is minutely shifted laterally for imaging. In the first imaging, region A1, enclosed with a continuous line rectangle, is picked up. In the second imaging, region A2, enclosed with a double line rectangle, is picked up. In the third imaging, region A3, enclosed with a dashed line rectangle, is picked up. In the fourth imaging, region A4 is picked up. In the fifth imaging, region A5 is picked up. In the sixth imaging, region A6 is picked up. FIG. 6(C) is a drawing showing an example wherein an image formation position is minutely shifted vertically for imaging. In the first imaging, region A1, enclosed with a continuous line rectangle, is picked up. In the seventh imaging, region A7, enclosed with a double line rectangle, is picked up. In the thirteenth imaging, region A13, enclosed with a dashed line rectangle, is picked up. In the eighth through 12th imaging and the 14th through 18th imaging, an image is picked up by minutely shifting image formation position both of laterally and transversally direction. In the above-mentioned manner, imaging of high pixel numbers up to 18 times of specific pixels of the solid imaging element, i.e., with high resolution, can be conducted. For example, if the specific pixel number of the solid imaging element is 400,000 pixels, high resolution imaging of 7,200,000 pixels can be conducted.

Incidentally, the above-mentioned image shifting is conducted as follows. When an operator activates operation unit 120 so as to input a specific amount of shifting of the image formation position, based on the indicated input, control unit 110, through imaging control unit 171, controls image shifting control unit 174 and imaging property correcting image processing means 175 of imaging means 70. Therefore, imaging not conducting image shifting at all (in this occasion, imaging time is 1/18 though the pixel number is 400,000), imaging with 1/3 density in the lateral and vertical directions by tripling the spacing of the above-mentioned image shifting and imaging with double density in lateral and transversal direction by halving the spacing of the above-mentioned image shifting, can be conducted.

Figure 7:
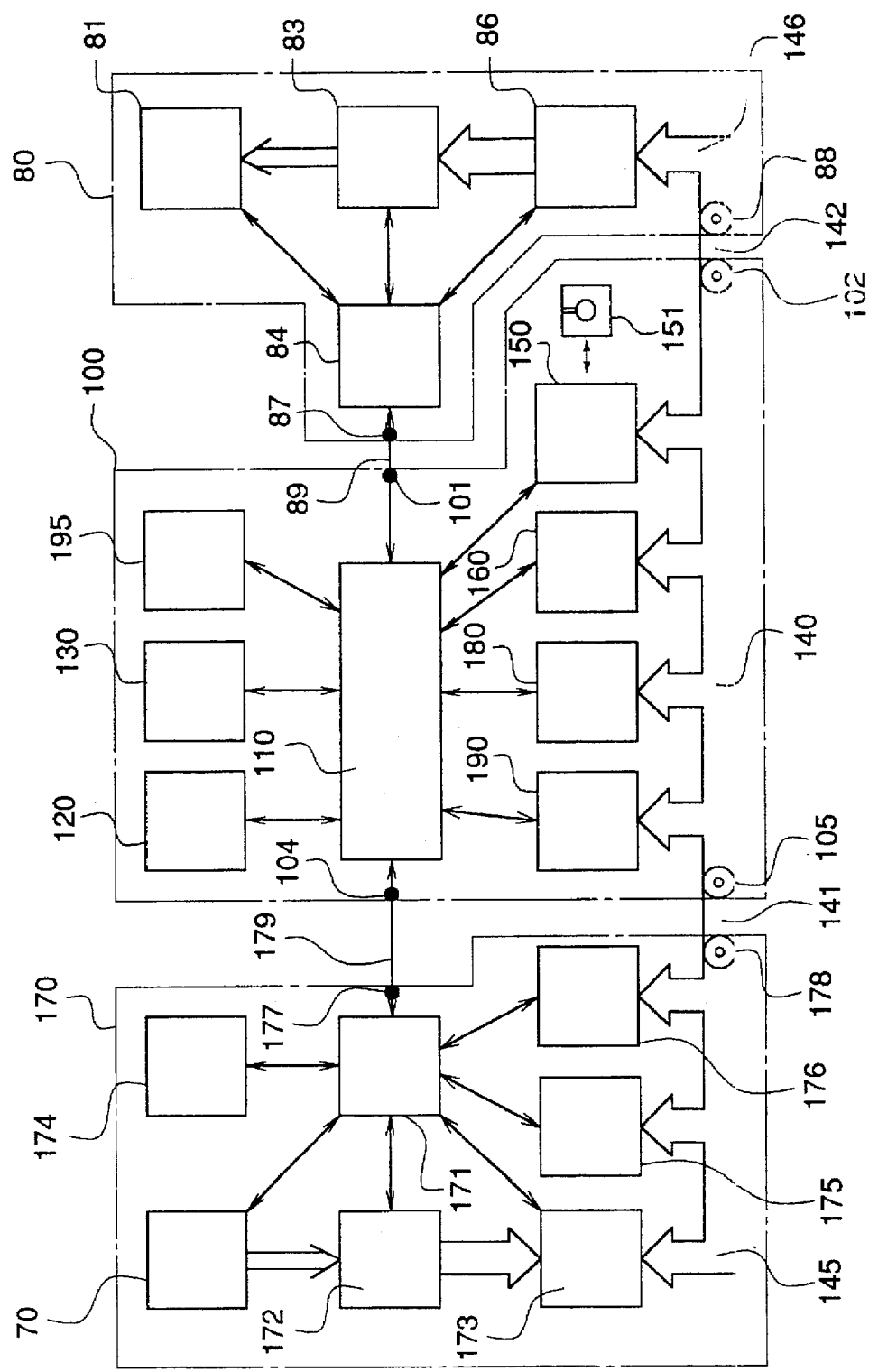
FIG. 7 is a control and image information transferring path drawing inside automatic printer B of Example 1.
Figure 8:
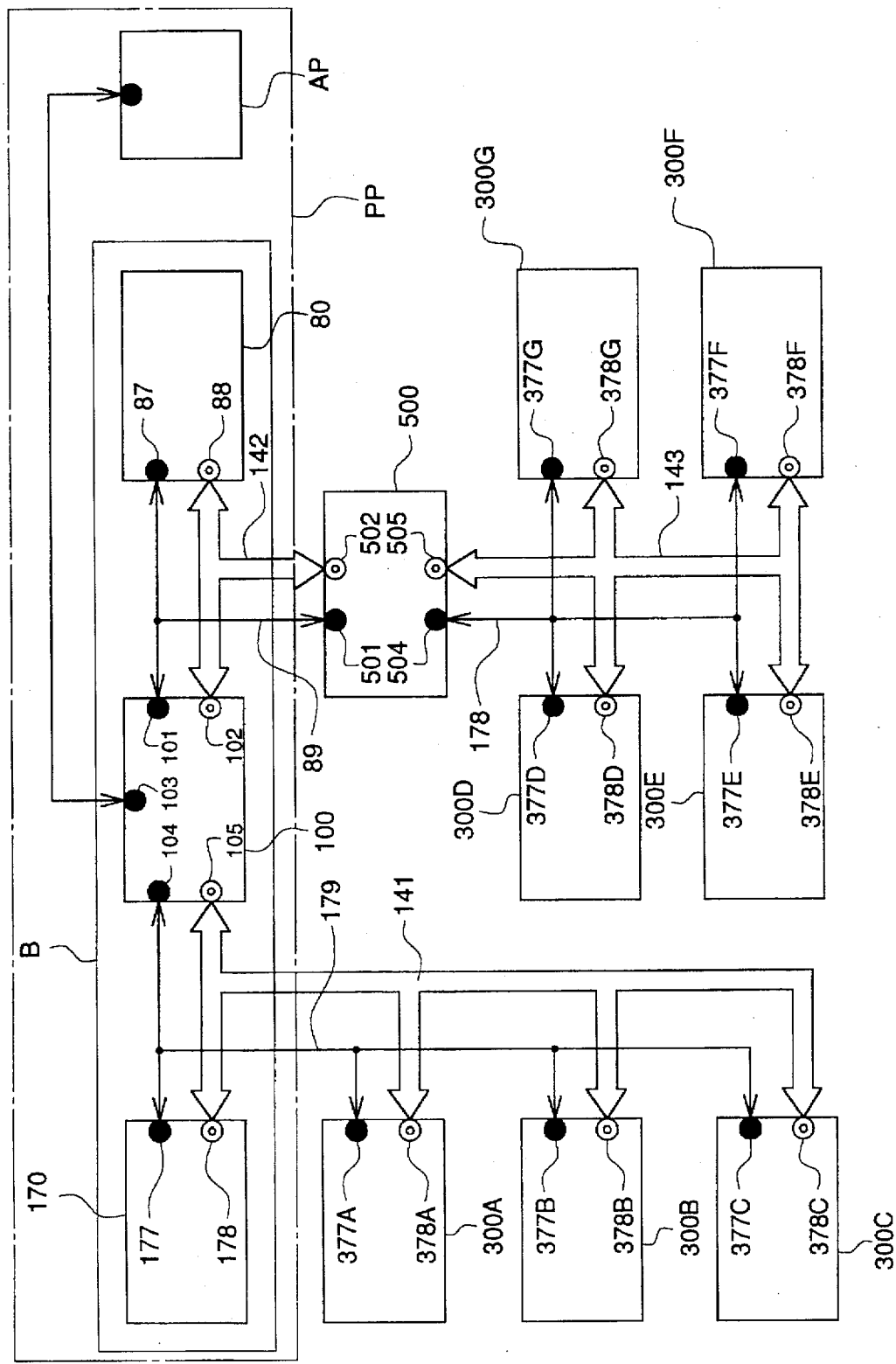
FIG. 8 is a drawing for the control and image information transferring path inside the automatic printer B of Example 1.

FIG. 7 is a drawing showing main control relationship of the present example. ● represents a connection unit of the control interface. ⊙ represents a connection unit of the SCSI interface. Photographic image imaging unit 170 in automatic printer B has connection unit 178 for connecting through image processing means 100 and the SCSI interface 141 and connection unit 177 for connecting through image processing means 100 and control interface 179. Image processing means 100 in automatic printer B has photographic image imaging apparatus connecting unit 104 capable of connecting to plural photographic image imaging apparatus which connects to photographic image imaging unit 170 through control interface 179, photographic image imaging device connecting unit 105 capable of connecting to plural photographic image imaging device connecting through SCSI interface 141, connecting unit 101 for connecting to CRT 80 for reproduction through control interface 89 and connecting unit 102 for connecting to CRT 80 for reproduction through SCSI interface 142. CRT 80 for reproduction in automatic printer B has image processing device connection unit 87 capable of connecting to plural image processing devices which connect to image processing means 100 through control interface 89 and image processing device connecting unit 88 capable of connecting to plural image processing devices which connect each other through SCSI interface 142.

Control signal from control unit 110 in image processing means 100 is sent to imaging control unit 171 in photographic image imaging unit 170 through photographic image imaging device connecting unit 104, controlling interface 179 and connecting unit 177 of photographic image imaging unit 170. In addition, control signals from control unit 110 are sent to CRT control unit 84 of CRT 80 for reproduction through connecting unit 101, controlling interface 89 and connecting unit 87 of CRT 80 for reproduction. Control signals from control unit 110 are, through control interface in image processing means 100, sent to operation unit 120 in image processing means 100, operation display unit 130, electronic image information recording means and electronic image information reading means 150, image processing unit 160, image memory 180, image display monitor 190 and other control units 195. From these units, through each control interface, information of each unit and each means is sent to control unit 110. In photographic image imaging unit 170, imaging control unit 171 controls, through the control interface in imaging image imaging unit 170, image shift control unit 174, photographic image imaging means 70, A/D conversion unit 172 and image transfer memory 173. In addition, from these, information of each unit and each means is sent to imaging control unit 171.

In photographic image imaging unit 170, there are provided imaging control unit 171, image shift control unit 174, photographic image imaging means 70, A/D conversion unit 172, image transfer memory 173, imaging property correction image processing means 175 and imaging image storing means 176. Through control interface in photographic image imaging unit 170, imaging control unit 171 controls image shift control unit 174, photographic image imaging means 70, A/D conversion unit 172, image transfer memory 173, imaging property correction image processing means 175 and imaging image storing means 176. In addition, from these, information from each unit and each means is sent to imaging control unit 171.

Imaging image storing means 176 has a function to memory-store digital imaging image signals, which are picked up sequentially due to image shifting, which are stored temporarily in image transfer memory 173 and sent sequentially and also to memory-store digital imaging image signal for one frame, and also has a function to memory-store a digital imaging image signal for one frame of the color film image, in which photographic property of photographic image imaging means is corrected by imaging properties correction image processing means 175.

Photographic property correction image processing means 175 has a function to correct digital imaging image signals sent from image transfer memory 173 sequentially and temporarily stored in imaging image storing means 176 with imaging property of the above-mentioned photographic image imaging means 70, and also has a function to operate for calculating exposure conditions (electric shutter time of the solid imaging element) of image information for exposure determination sent from image transfer memory 173 and also serves as a imaging exposure conditions determining means sent to control unit 171.

Image memory 180 has sufficient memory storage in the same manner as in silicone disc. It can memory-store at least electronic image information greater than a prescribed amount (for example, for 40 frames). Image memory 180 has a function to memory-store digital imaging image signals wherein imaging property of photographic image means 70 sent from imaging property of photographic image means 70 is stored for plural image frames of color film, a function to memory-store electronic image information which was read from a mini-magnet disc 151 which is integral to electronic image information recording means and a function to memory-store electronic image information image-processed or synthesized due to image processing unit 160.

Electronic image information recording means and electronic image information reading means 150 lets mini-magnetic disc 151 record electronic image information, and also read electronic image information from mini-magnetic disc 151. This mini-magnetic disc, a recording media capable of being transported, has the capacity to memory-store an image of 1000 or more frames. Functions of electronic image information recording means and electronic image information reading means 150 include functions to record digital imaging image signals wherein photographic properties of photographic image imaging means have been corrected in mini-magnetic disc 151 wherein a color film of plural image frames are set, functions to read electronic image information from the integral mini-magnetic disc 151 and functions to record electronic image information image-processed or synthesized by means of image processing unit 160 in integral mini-magnetic disc 151. It is preferable that electronic image information recording means and electronic image information reading means 150 be used for backing up electronic image information stored in image memory 180 or for storing electronic image information of any amount which cannot be stored in image memory 180.

Control unit 110 selects, based on inputting from operation unit 120 by the operator, electronic image information stored in image memory 180 and electronic image information, read by electronic image information reading means 150, recorded on mini-magnetic disc 151.

Image processing unit has a function to image-process to synthesize several types of electronic image information, wherein correction of imaging properties due to imaging properties correction image processing means 175 has been added, stored in image memory 180 or electronic image information read from mini magnetic disc 151 integral in electronic image information reading means 150 and a function to image-process electronic image information, wherein correction of imaging properties due to imaging properties correction image processing means 175 has been added, stored in image memory 180 or electronic image information read from mini magnetic disc 151 integrally built-in electronic image information reading means 150. Based on instructions by the operator inputted by operation of operation unit 120, a function is selected and executed.

CRT 80 for reproduction consists of CRT control unit D/A conversion unit 83, CRT main body 81 for reproduction and reproduction properties correction image processing means 86. Through a control interface in CRT 80 for reproduction, CRT control unit 84 controls D/A conversion unit 83, CRT main body 81 for reproduction and reproduction properties correction image processing means 86. From these units, information of each unit and each means is sent to CRT control unit 84. Reproduction properties correction image processing means 86 has a function to correct reproduction properties of CRT 80 for reproduction, which is a reproduction means. It sends corrected signals to D/A conversion unit 83 one by one.

Next, the flow of an image signal will be explained. A imaging image signal is sent from photographic image imaging means 70 to A/D conversion unit 172. The imaging image signal is converted to a digital imaging image signal in A/D conversion unit 172, and then, sent to image transfer memory 173, where it is stored temporarily. It is sent from image transfer memory 173 to imaging image storing means 176 sequentially every time imaging by means of the image shift method is conducted. The digital imaging image signal is temporarily stored in imaging image storing means 176. When one new frame of digital imaging image signal is stored in imaging image storing means 176, the aforesaid new frame of digital imaging image signal is subjected to imaging properties correction by means of imaging properties correction image processing means 175, and then, is stored in imaging image storing means 176. When adjusting focus, while the position of focus of imaging lens means 72 is changed stepwise, the imaging image signal of solid imaging element 71 is converted to a digital imaging image signal in A/D conversion unit 172 and is inputted to imaging properties correction image processing means 175 so that focusing position where the focus is most fitted is determined. The signal is sent to imaging control unit 171, where the focus position of imaging lens means 72 is adjusted to the most suitable focus position. In addition, when exposure is adjusted, the imaging image signal is converted to a digital imaging image signal in A/D conversion unit 172, and then, inputted to imaging properties correction image processing means 175 sequentially, where imaging light amount distribution is investigated so that an appropriate accumulation time (electronic shutter time) of solid imaging element 71 is determined. Following this, the signal is sent to imaging control unit 171 where the accumulation time of solid imaging element 71 is adjusted.

Based on a transfer control signals from control unit 110, electronic image information stored in imaging image storing means 176 is transferred to image memory 180, and stored there. In addition, it is sent to electronic image information recording means 150 and recorded on mini-magnetic disc 151, which is a transportable image recording medium. Based on instructions inputted by the operator by the use of operation unit 120, control unit 110 appropriately selects information to cause image processing unit 160 to read electronic image information, whose imaging properties are corrected, from image memory 180, and to cause electronic image information reading means 150 to read electronic image information which is recorded in the mini-magnetic disc which recorded electronic image information, set by the operator, reproducing, or synthesizing and reproducing, and then, cause to send information to image processing unit 160. Image processing unit 160, in accordance with instructions from control unit 110, image processes or image-processes to synthesize several electronic image information read, to cause image memory 180 to memory-store. Based on an instruction inputted by the operator by means of operation of operation unit 120, control unit 110 causes image memory to read electronic image information and sends information to image display monitor 190, where the image is displayed.

When the electronic image information to be reproduced is accumulated in image memory 180 by means of CRT 80 for reproduction at least a prescribed amount (for example, 40 frames or more), and when timing to be reproduced by means of CRT 80 for reproduction comes, based on a transfer control signal from control unit, electronic image information from image memory is read, and then, the information is transferred to reproduction properties correction image processing means 86. With regard to the transferred electronic image information, reproduction properties of CRT 80 for reproduction are corrected by means of reproduction properties correction image processing means 86 sequentially. The corrected information is sent to D/A conversion unit 83 sequentially. In D/A conversion unit 83, a CRT image signal, subjected to D/A conversion, is sent to CRT main body 81 for reproduction. CRT main body 81 for reproduction displays information on CRT screen 82 for reproduction.

In addition, the operator can input the amount of shifting image formation position by means of image shifting and either the first control mode, wherein imaging exposure conditions are continued to be used once determined, or the second control mode, wherein imaging exposure conditions are determined every time image shift is conducted by the use of operation unit 120. Based on instruction inputted, control unit 110 controls imaging means 70 through imaging control unit 171.

Hereunder, Example 12 will now be explained as follows. Differences from other Examples will be explained mainly.

In FIG. 7, imaging image storing means 176 is capable of storing a digital imaging image signal wherein its memory volume is 2 frames of picked up photographic film. The function of imaging image storing means 176 includes a function to memory-store digital imaging image signals individually which were picked up by means of image shift, stored temporarily in image transfer memory 173 and sent sequentially and to memory-store one frame of digital imaging image signal and also a function to temporarily memory-store one frame of digital imaging image signal wherein the imaging properties of the photographic image imaging means is corrected by means of imaging properties correction image processing means 175.

Incidentally, when a large memory volume is necessary for image synthesis, depending upon the contents of image processing selected by the operator, images are not displayed on image displaying monitor 190 by turning a switch inside image display monitor 190 OFF and memories for displayed electronic image information inputted in image displaying monitor are also used for image processing.

Image processing unit 160 has a function to image-process to synthesize several types of electronic image information wherein correction of imaging properties by means of imaging properties correction image processing means 175 which is stored in image memory 180 or electronic image information read from mini-magnetic disc 151 which is integral to electronic image information reading means 150, a function to image-process electronic image information wherein correction of imaging properties by means of imaging properties correction image processing means 175 which is stored in image memory 180 or electronic image information read from mini magnetic disc 151 which is integral to electronic image information reading means 150, a function as a display image information producing means which image-process to produce display electronic image information , which is electronic image information for image display monitor 190, from image information stored in a storing memory and a function as a reproduction image information producing means which expands the electronic image information, stored in the storing memory, by integer-multiplication vertically and laterally (two or more times vertically and laterally) and, concurrently with this, correct reproduction properties of CRT 80 for reproduction, which is a reproduction means. Based on instructions inputted by the operator by the use of operation unit 120, each function is selected and executed.

Image display monitor 190 is composed of an inputting unit, a switch which follows, in the flow chart, the inputting unit, a D/A converter which follows the switch and a CRT main body which follows the D/A converter. When memory for displaying electronic image information on the image display monitor in image memory 180 is also used for image processing, based on control signals from control unit 110, the switch interrupts inputting of the display electronic image information. Due to this, poor images during image processing are not displayed. Otherwise, the displayed electronic image information , which by-passes the switch, from image memory 180, is subjected to D/A conversion in the D/A converter. Image information subjected to D/A conversion is displayed on the CRT or a liquid crystal display.

EXAMPLE 6

Figure 15:
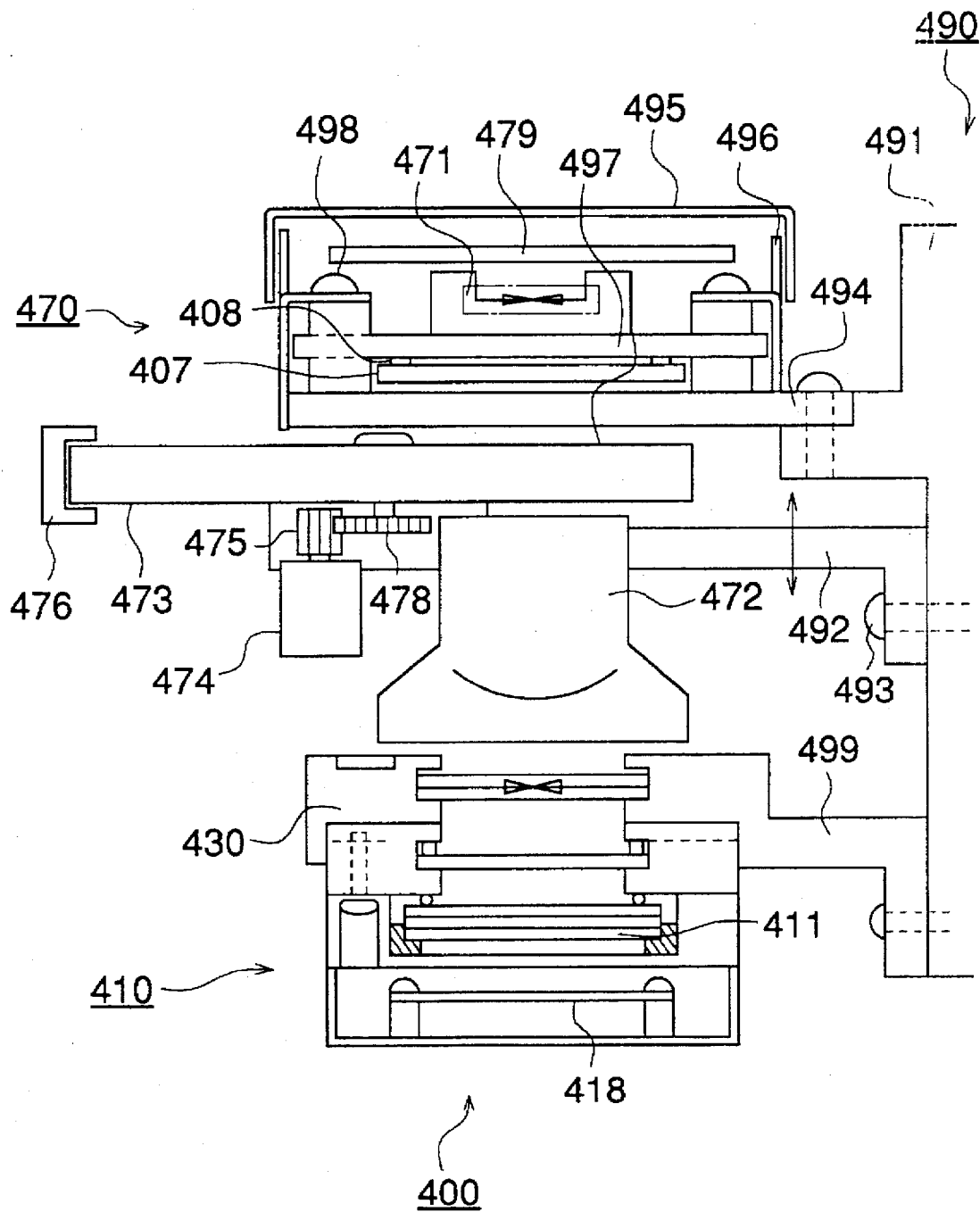
FIG. 15 is a diagram of a photographic image imaging device of Example 3.
Figure 16:
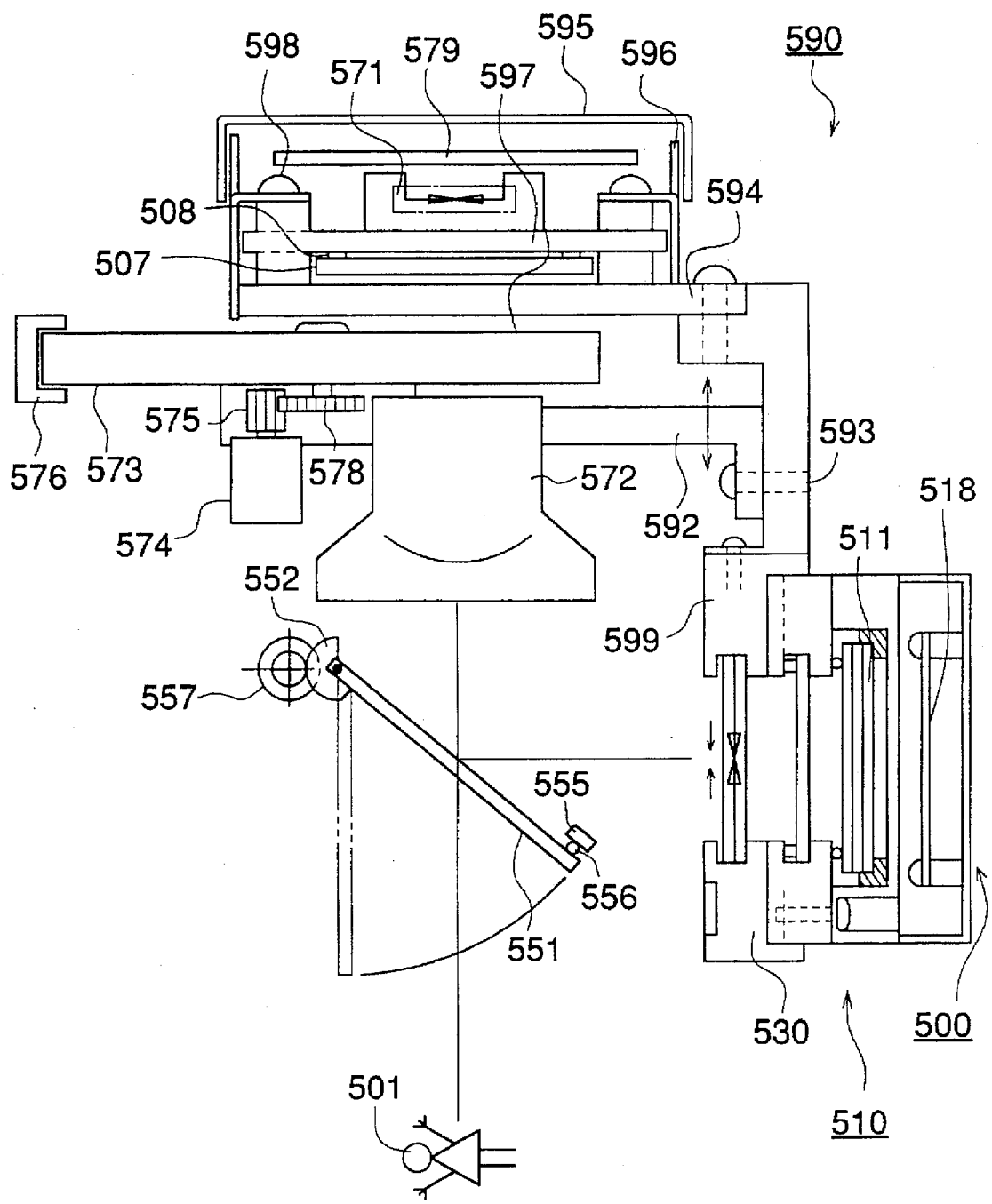
FIG. 16 is a diagram of a photographic image imaging device of Example 4.

FIG. 15 is a drawing showing connectional relationship between the control interface and the SCSI interface, which is an electronic image information interface between automatic printer B, which is a photographic image reproduction device of the present example, another image processing device 500 and other photographic image imaging devices 300 A through G. The symbol ● represents a connection unit of the control interface. The symbol ◉ represents a connection unit of the SCSI interface.

Printer processor PP of the present example is composed of automatic printer B and automatic processing machine AP which develops the photographic paper printed by automatic printer B. Automatic printer B consists photographic image imaging unit 170, image processing means 100 which image-processes the electronic image information of the photographic image picked up by means of photographic image imaging unit 170 or photographic image imaging devices 300A through C and CRT 80 for reproduction, which forms a photographic image on a photographic light-sensitive material for printing, by means of the CRT, from the electronic image information of the photographic image processed by means of image processing device 500 and image processing means 100. Photographic image imaging unit 170, which is located inside automatic printer B, has connection unit 177 for connecting with image processing means 100 through control interface 179 and connection unit 178 for connecting with image processing means 100 through SCSI interface 141. Image processing means 100, located in automatic printer B, has photographic image imaging device connection unit 104, capable of being connected with plural photographic image imaging devices, which is connected with photographic image imaging unit 170 (a photographic image imaging device in the first embodiment for attaining the present invention) and plural photographic image imaging devices 300A through C through control interface 179, photographic image imaging device connection unit 105 which is capable of being connected with plural photographic image imaging devices which are connected through SCSI interface 141, connection unit 101 for connecting with CRT 80 for reproduction through control interface 89, connection unit 102 for connecting with CRT 80 for reproduction through SCSI interface 142 and connection unit 103 for connecting with automatic processing machine AP through the control interface. CRT 80 for reproduction has image processing device connection unit 87, capable of being connected with plural image processing device, which is connected with image processing means 100 (an image processing device in the second embodiment for attaining the 12th object) and image processing device 500 which image-processes the electronic image information and image processing device connection unit 88, capable of being connected with plural image processing devices, which are connected through SCSI interface 142.

Image processing device 500 may have the same structure as image processing means 100 shown in FIG. 7, it has photographic image imaging device connection unit 504, capable of being connected with plural photographic image imaging devices, which is connected with plural photographic image imaging devices 300D through G through control interface 178, photographic image imaging device connection unit 505, capable of being connected with plural photographic image imaging devices, which is connected through SCSI interface 143, photographic image imaging device connection unit 501 which is connected with image processing means 100 and CRT 80 for reproduction through control interface 89 and photographic image imaging device connection unit 502 which is connected with image processing means 100 and CRT 80 for reproduction through SCSI interface 142. Image processing means 100 and image processing device 500 are connected through control interface 89 and SCSI interface 142. Both can exchange electronic image information each other.

Photographic image imaging devices 300 A through C respectively have image processing means 100, connection units 377 A through C, which are connected each other by means of control interface 179 and connection units 378A through C, which are connected each other by means of SCSI interface 141. In the same manner, photographic image imaging devices 300 D through G respectively have image processing means 500, connection units 377 D through G, which are also connected each other by means of control interface 178 and connection units 378D through G, and which are in turn connected each other by means of SCSI interface 143.

Figure 9:
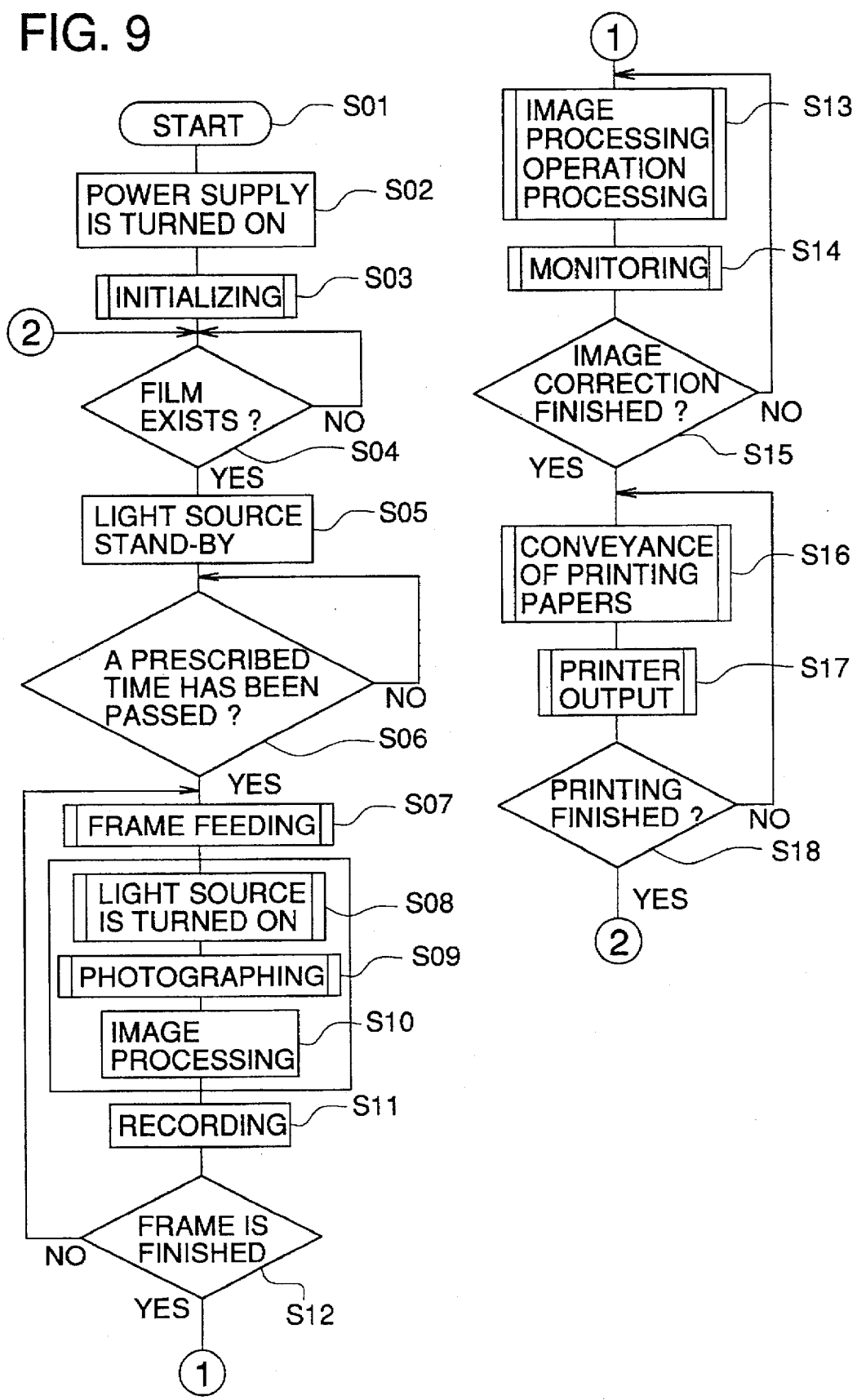
FIG. 9 is a control flow chart of Examples 1 through 5.

FIG. 9 is an example of a control flow chart. Starting with S01. In S02, power supply is turned ON. In S03, the apparatus is initialized. In addition, here, the operator inputs into operation unit 120 the amount of shifting image forming position by means of image shifting and decides whether imaging exposure conditions are determined every time image shift is conducted (namely, whether the first control mode or the second control mode shown in the embodiment for attaining the fifth object) and inputs. Following this, the results inputted by the operator by means of operation unit 120 are set in control unit 110. In S04, it is sensed whether a color film has been set into negative film carrier 30. If no film has been set into negative film carrier 30, operations do not advance beyond this step. If a film is set into negative film carrier 30, the flow advances to S05 and activate light source 11. Apply voltage to the extent that the light source does not actually illuminate. In addition, insert double surfaced mirror into the exposure light path. In S06, the light source for exposure reaches constant temperature, and determination is made whether a prescribed time necessary to stop vibration, which is caused by means of photographic paper conveyance means, has passed. If it has not passed, operations do not advance beyond this step. If necessary prescribed time has passed, the flow advances to S07.

In S07, control unit 110 activates a motor to drive color film driving rollers 33 and 34. Due to this, the color film is conveyed until the succeeding image frame is sensed. In S08, light source for exposure 11 is lit.

In S09, the frame image of color film set onto negative film carrier 30 is picked up while image-shifting, and then, stored in imaging image storing means 176. S09 is composed of a sub-routine illustrated in FIG. 10 and FIG. 11. If control unit 110 is set not to determine imaging exposure conditions for every image shift, namely, if, after determining imaging exposure conditions initially, aforesaid imaging exposure conditions are used not determining the imaging exposure conditions again (which is the first control mode as described above), enter the sub-routine described in FIG. 10. If control unit 110 is set to determine the imaging exposure conditions for every image shift (which is the second mode as described above), enter the sub-routine illustrated in FIG. 11.

Figure 10:
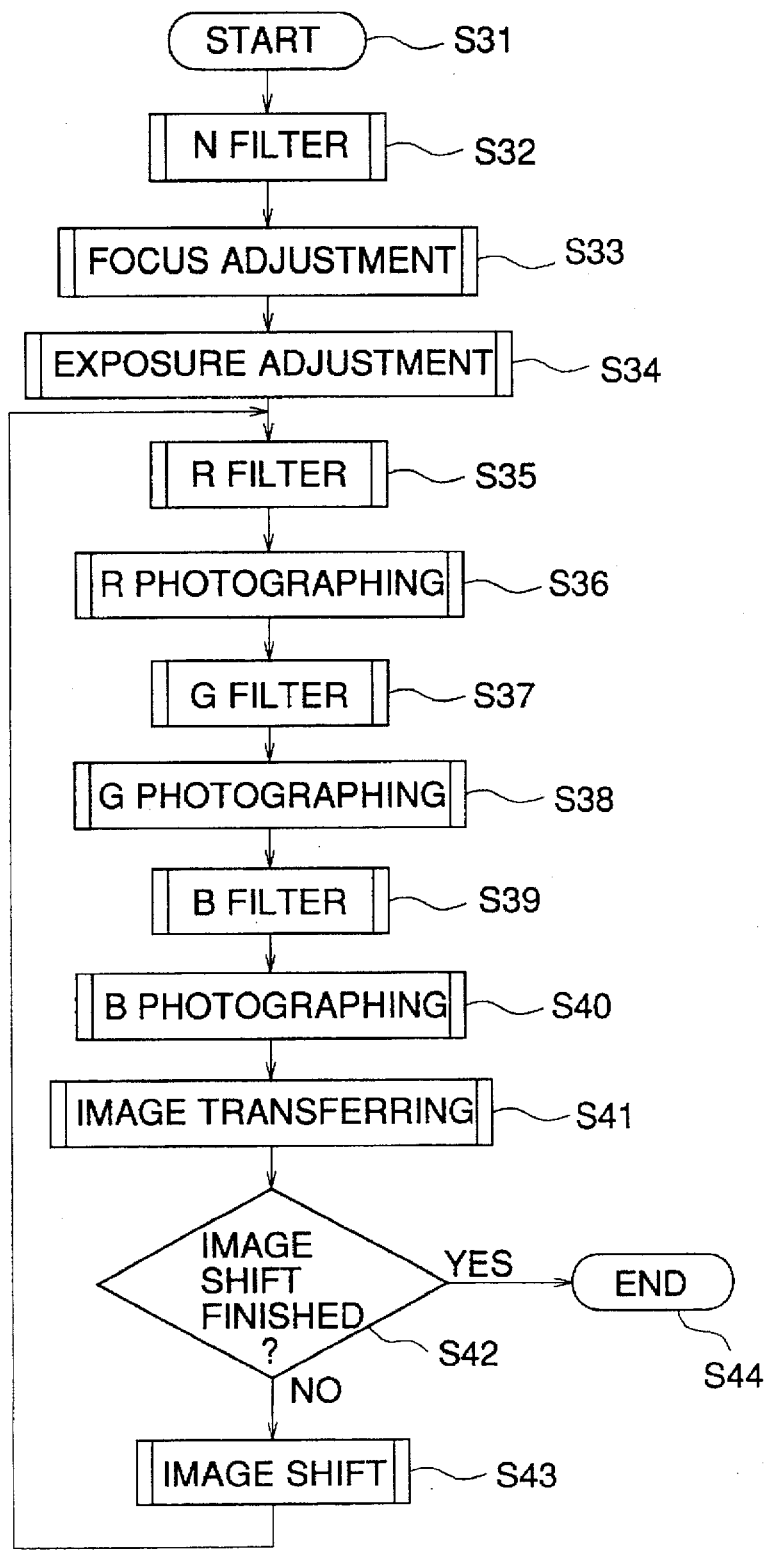
FIG. 10 is a control flow chart of the first control mode in Examples 1 through 5.

The sub-routine illustrated in FIG. 10 will now be hereunder explained. After starting with S31, in S32, color light cutting filter supporting means 73 rotates and sets a filter for determining exposure of N shown in FIG. 4 into the light entrance side of imaging lens means 72. In S33, based on imaging information from solid imaging element 79, imaging control unit 171 adjusts the focus of imaging lens means 72.

In the sub-routine of imaging (S09) illustrated in the above-mentioned FIG. 10 and below-mentioned FIG. 11, focus adjustment (S33 and S53) will be described as follows.

In the case of an image shift camera, plural sheets of image data are synthesized. Therefore, focusing cannot be adjusted by viewing the image in a real time. There is no option other than to adjust the focus by operating the image shift camera as an ordinary video camera wherein image shift is not conducted. However, in this situation, spatial frequency greater than the pixel pitch of the CCD cannot be sensed. As a result, when an image-shifted-image with high image quality is obtained, it cannot be found whether the focus is suitable.

As a countermeasure therefor, with regard to an individual line from which data is picked up, image shift is not initially conducted, but is conducted focus adjustment. After sensing rough focus, image shift is conducted for an individual line so that accuracy of the sensing focus position is enhanced. Since image shift is conducted only for one line, focus can be adjusted at high speed and high accuracy.

Figure 12:
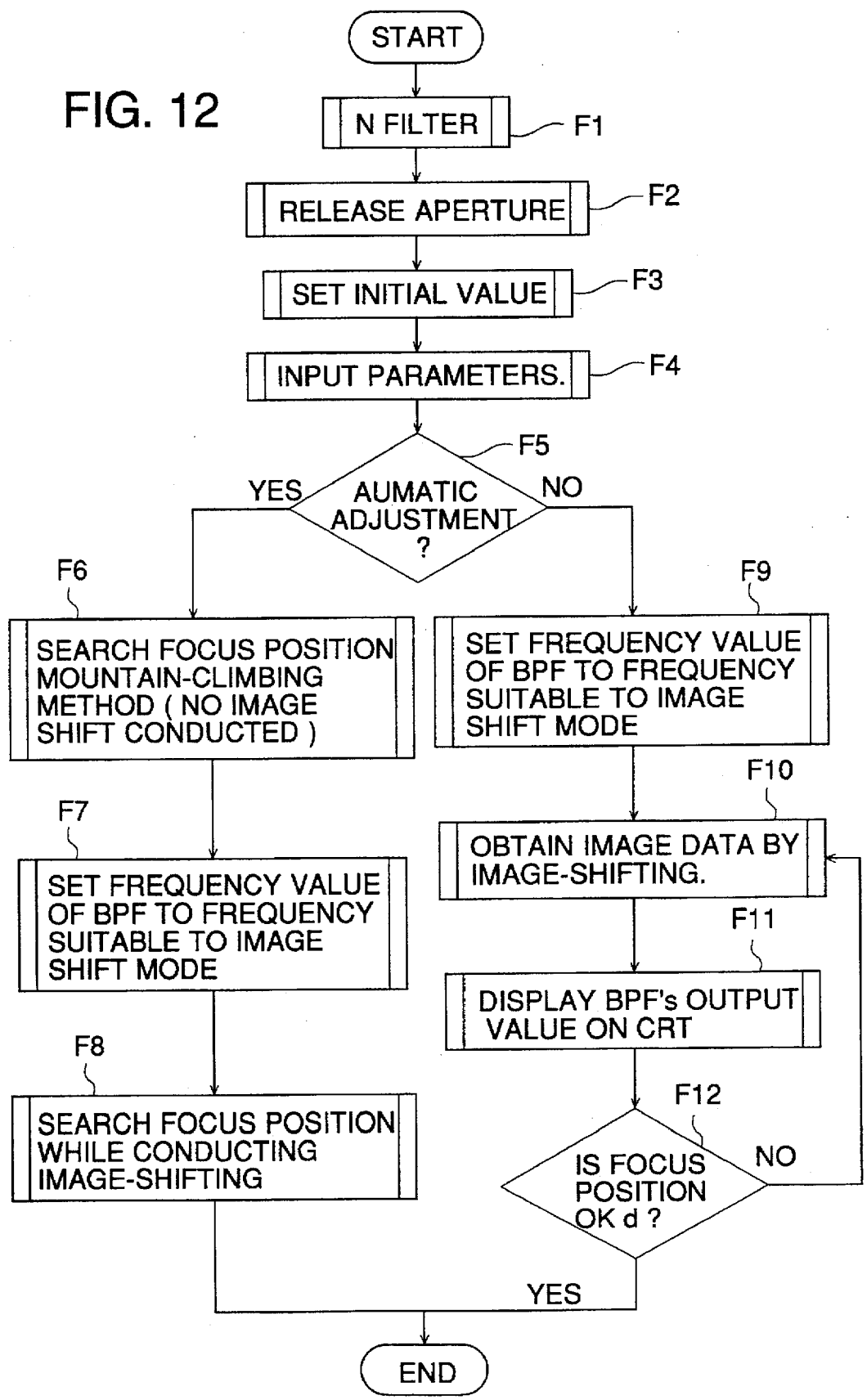
FIG. 12 is a control flow chart when an indivudual line on the display is designated and focus-adjustment is conducted.

The above-mentioned focus adjustment is composed of a sub-routine illustrated in FIG. 12.

Figure 11:
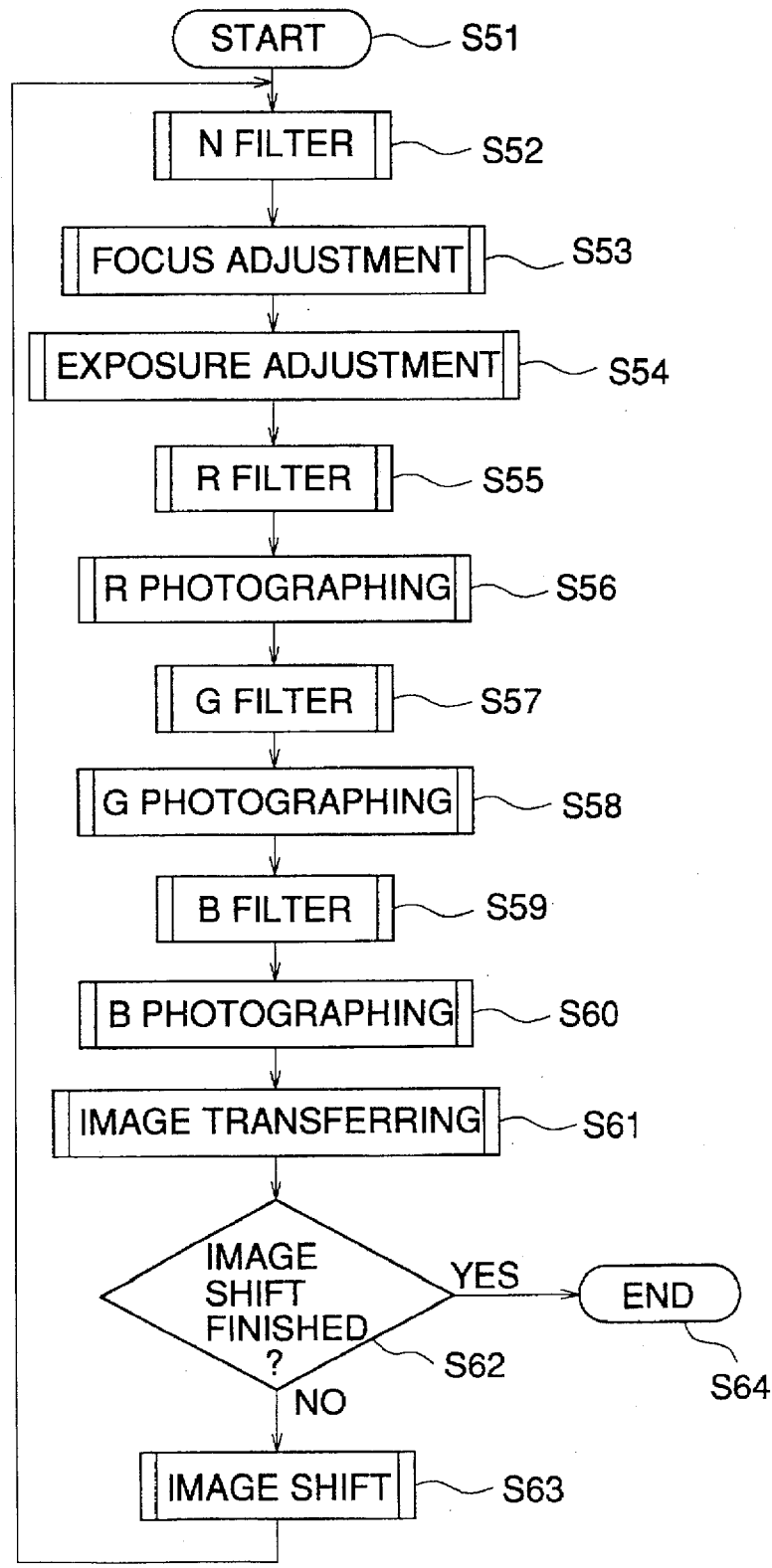
FIG. 11 is a control flow chart of the second control mode in Examples 1 through 5.

Therefore, after focus adjustment is finished, the flow chart advances to exposure adjustment in FIG. 10 (S34) and exposure adjustment in FIG. 11 (S54) respectively.

Referring to FIG. 12, a sub-routine of focus adjustment will be explained as follows.

[Processing Conducting to be Prior to Focus Adjustment]

First of all, set a transparent filter or an ND filter (an N filter) (F1) in order to adjust focus.

Next, release aperture (F2).

Next, input an initial value (F3). At this step, input the parameters of a band pass filter (hereinafter, referred to as "BPF") so that spatial frequency, which is viewed when focus is adjusted while image shift is being conducted.

Then, input any parameters necessary to adjust focus (F4). In this occasion, inputted parameters include selection between an image shift mode (number of shifting), an auto-focus mode (AF mode) or a manual mode (adjustment is conducted manually by operating the lens) and designation of a specific line wherein focus adjustment is conducted (F5). (see FIG. 13(A)).

The marker representing a line from which data is to be outputted, as shown in FIG. 13(A) is moved upward/downward by means of the key for selecting the line.

[Processing by Means of the AF Mode]

While no image shift is being conducted and while viewing the spatial frequency set by the initial setting, focus is adjusted roughly by the use of a mountain-climbing method (F6).

Next, after the above-mentioned focus adjustment is completed, set the spatial frequency sensed by the BPF at a high enough frequency which can be sensed by image shifting (F7). For example, in the case of double image shifting, set the frequency to ½, and in the case of triple image shifting, set the frequency to ⅓ of the frequency when focus is adjusted, not conducting image shift.

In addition, while conducting image shift, conduct focus adjustment by the use of the mountain-climbing method again at the frequency set in F7 (F8). Due to this adjustment, focus adjustment can be conducted for high frequency component, which cannot be sensed when image focusing is not conducted, which is contained in an image subjected to image shifting. Therefore, focus adjustment with high accuracy can be achieved.

[Processing by Means of the Manual Mode]

First of all, in the same manner as in F7 in the AF mode, set the spatial frequency sensed by the BPF at a high enough frequency which can be sensed by image shifting (F9).

Next, conduct image shifting so as to obtain image data (F10).

Then, display the outputted value of BPF, obtained from the image data in F10, on the CRT (F11) (see FIG. 13(B)).

Incidentally, focus level, shown in FIG. 13(B), which exhibits to what degree focus is fitted is shown by means of an oil gauge. However, another method can be used.

Next, while viewing the indication, a user moves the position of the focus of lens so that the outputted value of the BFP becomes largest. Thus, focus is adjusted (F12).

When the focus is not fit, return to the above-mentioned F10.

In S34, based on image information wherein solid imaging elements of photographic image imaging means are picked up and produced, imaging exposure conditions are determined, and exposure is adjusted wherein electronic shutter time of solid imaging element 79 is adjusted. In S35, an R color light cutting filter is set in front of the light entrance side of imaging lens means 72. In S36, solid imaging element 71 of photographic image imaging means 70 picks up the R color of photographic image of photographic original. The picked up R color is converted to a digital image in A/D conversion unit 172, and then, stored in image transfer memory 173. In S37, a G color light cutting filter is set to the light entrance side of imaging lens means 72. In S38, solid imaging element 71 of photographic image imaging means 70 picks up the G color of photographic image of photographic original. The picked up G color is converted to digital image in A/D conversion unit 172, and then, stored in image transfer memory 173. In S39, a B color light cutting filter is set in front of the light entrance side of imaging lens means 72. In S40, solid imaging element 71 of photographic image imaging means 70 picks up the B color of the photographic image of the photographic original. The picked up B color is converted to a digital image in A/D conversion unit 172, and then, stored in image transfer memory 173. In S41, a digital image signal stored in image transfer memory 173 is stored in imaging image storing means 176 through a data bus inside photographic image imaging unit 170. In S42, determination is made whether image shift is finished. If it is not finished, in S43, conducts a prescribed image shift by the control of image shift control unit 174, and then, advances to S35. If it is finished, this sub-routine in S44 is completed, and then, advances to S10.

The sub-routine illustrated in FIG. 11 will now be hereunder explained. After starting with S51, in S52, color light cutting filter supporting means 73 is rotated and a filter for determining exposure of N shown in FIG. 4 is set in front of the light entrance side of imaging lens means 72. In S53, based on imaging information from solid imaging element 79, imaging control unit 171 adjusts focusing of imaging lens means 72.

In addition, focus adjustment sub-routine illustrated in the above-mentioned FIG. 12 is conducted.

In S54, based on image information wherein solid imaging element of photographic image imaging means picked up and produced, imaging exposure conditions are determined, and exposure is adjusted wherein electronic shutter time of solid imaging element 79 is adjusted. In S55, an R color light cutting filter is set in front of the light entrance side of imaging lens means 72. In S56, solid imaging element 71 of photographic image imaging means 70 picks up the R color of photographic image of photographic original. The picked up R color is converted to digital image in A/D conversion unit 172, and then, stored in image transfer memory 173. In S57, a G color light cutting filter is set into the path of the light entrance side of imaging lens means 72. In S58, solid imaging element 71 of photographic image imaging means 70 picks up the G color of photographic image of photographic original. The picked up G color is converted to digital image in A/D conversion unit 172, and then, stored in image transfer memory 173. In S59, a B color light cutting filter is set to the light entrance side of imaging lens means 72. In S60, solid imaging element 71 of photographic image imaging means 70 picks up the B color of photographic image of photographic original. The picked up B color is converted to digital image in A/D conversion unit 172, and then, stored in image transfer memory 173. In S61, a digital image signal stored in image transfer memory 173 is stored in imaging image storing means 176 through a data bus located inside photographic image imaging unit 170. In S62, determine whether image shift is finished. If it is not finished, in S63, a prescribed image shift by the control of image Shift control unit 174 is conducted, and then, advance to S52. If it is finished, this sub-routine in S64 is completed, and then, advances to S10.

In S10, a digital image signal stored in imaging image storing means 176 is read. Through data bus 145, the digital image signal is transferred to imaging properties correction image processing means 175. In imaging properties correction image processing means 175, the transferred digital image signal is corrected in accordance with the imaging properties of photographic image imaging means 70. Next, the digital image signal is sent, which was corrected in accordance with the imaging properties of photographic image imaging means 70, to imaging image storing means 176 through data bus 145 for storing. Electronic image information, which was corrected in accordance with the imaging properties of photographic image imaging means is read and stored in imaging image storing means 176. Through SCSI interface 141, the information in image memory 180 is stored. In S11, electronic image information, which was corrected in accordance with the imaging properties of photographic image imaging means is read, stored in image memory 180. Through data bus 140, the information to electronic image information recording means 150 is sent, and then, it is stored in mini-magnetic disc 151 which is a transportable image recording medium. In S12, determination is made whether all frame images of the color film set into negative film carrier have been exposed. If all frames have not been exposed, the flow chart advances to S07. If exposed, it advances to S13. In this manner, plural frame images of the color film are picked up sequentially, and stored.

In S13, the operator inputs instructions by operating operation unit 120 while viewing the operation display unit 130 in order to evaluate, modify or image-synthesize the image of each frame or to call up the display of another image. According to the contents of the instruction control unit 110 selects to read the electronic image information from image memory 180 or to read the electronic image information recorded in mini magnetic disc 151 which is integral to electronic image information recording means 150, and then, to read the electronic image information from image memory 180 or to read the electronic image information recorded in mini magnetic disc 151 which is integral to electronic image information recording means 150. From the read electronic image information, image processing such as amendment or synthesis of the image is conducted, or the read electronic image information in image memory 180 is stored as it is. In S14, the results of image processing and the instructed image is displayed. In S15, determination is made whether amendment or synthesis of the image is finished. If it is not finished, the flow chart returns to S13.

If it is finished, the flow chart advances to S16, where photographic paper is conveyed to a printing position. In S17, by means of automatic printer B, print or reproduce as printer outputting. In S18, determination is made whether printing and reproducing has been finished. If printing and reproducing has not been finished, the flow chart advances to S16. If printing and reproducing has finished, advance to S04. With regard to printing, in accordance with the content of outputted images, control unit, while the double surfaced mirror is removed from the exposure light path, conveys photographic paper to a printing position one frame at a time, conveys a color film in a reverse direction (S16) and lights the frame image of the color film for printing on the photographic paper (S17). The above-mentioned procedure is continuously repeated. With regard to reproducing, when the electronic image information to be reproduced is accumulated by a prescribed amount (for example, 40 frames) or more in image memory 180 and reproduction can be conducted, i.e., no printing is in progress or not under trouble, the double surfaced mirror is inserted in the exposure light path and the photographic paper is conveyed to the printing position (S16) and reproduction is conduct by CRT main body 81 for reproduction (S17). The above-mentioned procedure is continuously repeated. In the above-mentioned manner, printing of all image in the film to be printed and reproduction of electronic image information to be reproduced are conducted. In this situation, control unit 110 controls each unit so that a sheet type photographic paper is exposed.

Incidentally, in the above-mentioned control flow, the electronic image information to be reproduced is stored in image memory 180. When the electronic image information to be reproduced is accumulated in image memory 180 by a prescribed amount (for example, 40 frames or more), reproduction is conducted. It is also allowed that the electronic image information to be reproduced is recorded in mini-magnetic disc 151 and that, when mini-magnetic disc 151 having the electronic image information to be reproduced by a prescribed amount or more is recorded or set in electronic image information recording means 150, information is read and reproduced individually. In addition, it is also allowed that the electronic image information to be reproduced is appropriately stored in image memory 180 or mini magnetic disc 151 and that, when the electronic image information to be reproduced is accumulated by a prescribed amount or more when totaling the amount of image memory 180 and mini magnetic disc 151, reproduction is conducted.

In addition, the above-mentioned printing control means may be controlled so that printing is not conducted when imaging by means of the above-mentioned imaging means.

In addition, in FIG. 9, in S09, while the frame image of the color film, which is set to negative film carrier 30, is subjected to image shifting, three primary colors of R, G and B of the photographic image of a photographic original by means of solid imaging element 71 of photographic image imaging means 70 is picked up, the picked up image is converted to digital image by means of D/A conversion unit 172 and stored in image transfer memory 173 and the digital image signal, stored in image transfer memory 173, is stored in imaging image recording means 176 through a data bus in photographic image imaging unit 170. When image shift is finished, the flow chart advances to S10.

With regard to reproduction, when the electronic image information to be reproduced is accumulated by a prescribed amount (for example, 40 or more frames) in image memory 180 and reproduction can be conducted, i.e., no other printing is in progress or not during trouble, the double surfaced mirror is inserted in the exposure light path and the photographic paper is conveyed into the printing position (S16). Based on transfer control signals sent from control unit 110, the electronic image information to be reproduced is read from image memory 180, sent to image processing unit 160, where vertical and lateral integer multiplication enlargement is processed and the properties of reproducing means is corrected, and then, transferred to storing memory 86 for reproduction through connection unit 102 of an image processing means for one reproduction image one face as..reproduction electronic image information, and stored. The reproduction electronic image information stored in storing memory 86 for reproduction is subjected to D/A conversion and reproduced in CRT main body 81 for reproduction (S17). This procedure is continuously repeated. In the above-mentioned manner, printing of all images of a film to be printed and reproduction of the electronic image information to be reproduced are conducted. In this situation, control unit 110 controls each unit so that the sheets picked up paper are exposed to light.

Based on FIG. 1, the flow of photographic paper P is now explained. A roll photographic paper in magazine M is fed by means of roller R1, and then, cut it to individual print lengths by means of cutter Ct. The photographic paper cut to one print length is positioned to an exposure position by means of photographic paper supporting means, adhered by vacuum and printed. The printed photographic paper is conveyed to automatic processing machine AP by means of paired rollers R2, R3 and R4. The photographic paper conveyed to automatic processing machine AP is processed in color developing tank 1A, bleach-fixing tank 1B and stabilizing tanks 1C, 1D and 1E and dried in drier unit 6, and then, conveyed out as a finished print.

FIG. 1(B) is a model view of automatic processing machine viewed from top. In each processing tank 1A, 1B, 1C, 1D and 1E, temperature-constant tanks 2A, 2B, 2C, 2D and 2E, which regularize the temperature of the processing solutions, are respectively provided. In temperature-constant tank 2A, solid processing agent replenishing device 3A for color developing is provided. In addition, replenishing water is supplied from replenishing water supplying device 4. In temperature-constant tank 2B, solid processing agent replenishing device 3B for bleach-fixing is provided. In addition, replenishing water is supplied from replenishing water supplying device 4. Into temperature-constant tank 2C, overflow solution from stabilizing tank 1D overflows. Into temperature-constant tank 2D, overflow solution from stabilizing tank 1E overflows. In temperature-constant tank 2E, solid processing agent replenishing device 3E for stabling is provided. In addition, replenishing water is supplied from replenishing water supplying device 4.

EXAMPLE 2

Figure 14:
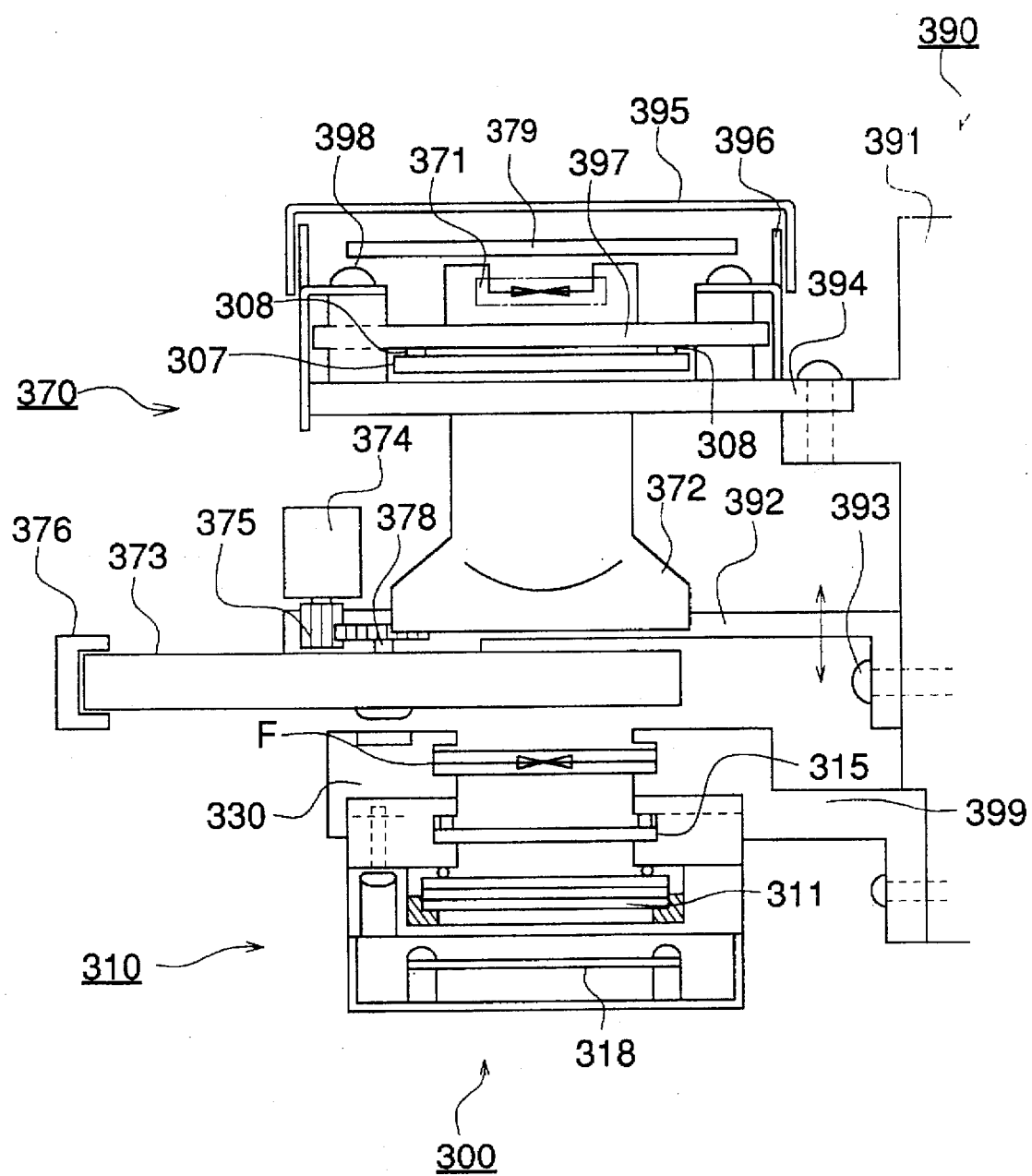
FIG. 14 is a diagram of a photographic image imaging device of Example 2.

FIG. 14 shows a diagram of photographic image imaging device of the present example. Photographic image imaging device 300 is illuminated by lamp house 310, and a color film supported by negative film carrier picks up by means of imaging means 370. In the present invention, the color film supported by the negative film carrier is not necessary to be a negative film. A positive film is also allowed. Lamp house 310, negative film carrier 330 and imaging means 370 are supported by frame 390.

Lamp house 310 is composed of surface light source 311, light adjusting filter 315, positioned in front of surface light source 311, and light amount sensing means 318, which senses light amount value of surface light source 311. By sensing the light amount value of surface light source 311 by means of light amount sensing means 318, the light amount of surface light source 311 is arranged to have a prescribed light amount value.

Negative film carrier 330 conveys the color film and positions the picked up frame.

On the light entrance side of lens means 372 for imaging, filter supporting means 373 is provided. Filter supporting means 373 is the same as one shown in FIG. 4. Filter supporting means 373 is a disc. On the disc surface, at the periphery, marks 377 for positioning are provided. By sensing these marks 377 by means of mark sensing means 376, B, G and R color light cutting filter is positioned. By means of the above-mentioned filter supporting means rotated position sensing means, the rotation position of filter supporting means 373 is sensed. Filter supporting means 373, through its central axis 378 and gear 375 which is engaged with central axis 378, is rotated and moved by means of driving motor 374 which is a filter supporting means rotation position driving means which rotates and drives filter supporting means 373. In addition, due to a color light cutting filter control signal in the control unit, not illustrated, by means of a filter supporting means rotation position sensing means and a filter supporting means rotation position driving means, the appropriate color light cutting filter is set into the light entrance side of lens means 372 for imaging.

Photographic image imaging means 370 is supported by frame 391. Solid imaging element 371 is supported by circular solid imaging element frame 397. Electronic board 379 for solid imaging element is positioned at the back of solid imaging element 371. Light-shielding cylinder 396, made of metal, whose inside is black is provided, as if enclosing the circumferential portion of disc-type solid imaging element frame 397. Light-shielding lid 395 is provided, as if engaging with this light-shielding cylinder 396. Imaging means supporting plate 394 supports solid imaging element 371 of lens means 372 for light-free imaging, and also supports disc-type solid imaging element frame 397 through a column. It is so arranged that light can only pass through lens means 372 for imaging and can enter solid imaging element 371 by means of light-shielding tube 396, light-shielding lid 395 and imaging means supporting plate 394. Frame 391 firmly supports photographic means supporting plate 394. Color light cutting filter means supporting plate 392 which supports color light cutting filter means composed of filter supporting means 373, gear 375, driving motor 374 and mark sensing means 376 can be adjusted forward/backward in relation to frame 391 in an arrowed direction shown in FIG. 14. Color light cutting filter means supporting plate 392 is, after being adjusted forward/backward, firmly locked by bolt 393.

Lamp house 310 and negative film carrier 330 are firmly supported by original unit supporting frame 399. Original unit supporting frame 399 is detachable from frame 391, and fixed by a screw.

In photographic image imaging device 300, image shift is conducted by parallel plate glass plate 307 provided through piezoelectric elements 308. By means of image shift control unit 174, an appropriate voltage is applied to plural piezoelectric element 308 which support parallel-surfaced plate glass plate 307. As a result, a part of plural piezoelectric elements 308 are expanded so that inclination of parallel plate glass plate 307 is minutely changed so that an image is formed on solid imaging element 371 through parallel plate glass plate 307. As a result, image formation position is minutely slid. This sliding method is the same as for explanation for FIGS. 6(A) through 6(C).

Control relationship is the same as a part of photographic image imaging unit 170 of Example 1. Through a connection unit, photographic image imaging unit 170 can be connected to an automatic printer in Example 1. In addition, image shift and control flow are the same as in Example 1.

Imaging lens means 372 can adjust focusing from the color film to an infinite distance. When original unit supporting frame 399 is removed from frame 391, three-dimensional objects can be picked up.

EXAMPLE 3

The present example is a variable example of Example 2. Since only machine structure is different, those where different are only explained. FIG. 15 shows a diagram of a photographic image imaging device of the present example. A point different from Example 2 is that filter supporting means 473 is provided on the light exiting end of lens means for imaging. Central axis 478 of filter supporting means 473, gear 375 which is engaged with central axis 478 and driving motor 474 which is a filter supporting means rotation position driving means which rotates and drives filter supporting means 473. In addition, due to a color light cutting filter control signal of the control unit, not illustrated, by means of a filter supporting means rotation position sensing means and a filter supporting means rotation position driving means, appropriate color light cutting filter is set to the light entrance side of lens means 472 for imaging. In this manner, when filter supporting means 473 is provided on the light exiting end of lens means 472 for imaging, the area of solid imaging element 71 is ordinarily smaller than the area of the picked up original. Therefore, it is allowed that a filter having a smaller area than the filter in Example 1 can be used. In addition, holes for the filter is allowed to be small. As a result, the thickness of filter supporting means 473 which was thick for maintaining stiffness can be reduced and overall area can be downsized.

EXAMPLE 4

Figure 13:
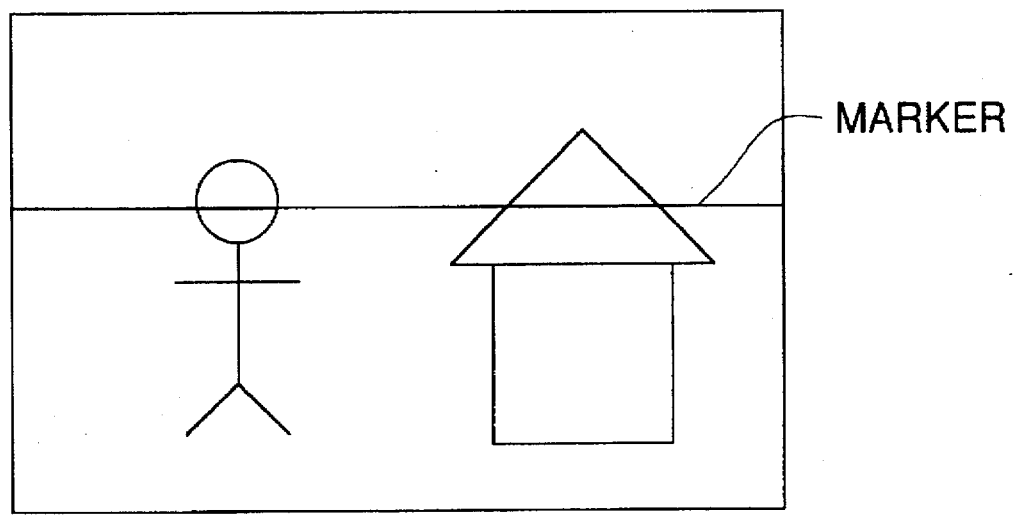
FIG. 13(A) shows a display when an individual line for obtaining data designated in the case of FIG. 12; and FIG. (B) is a display showing to what degree the focusing is properly attained when the focal adjustment is carried out by moving the lens manually in the case of FIG. 12.
Figure 13:
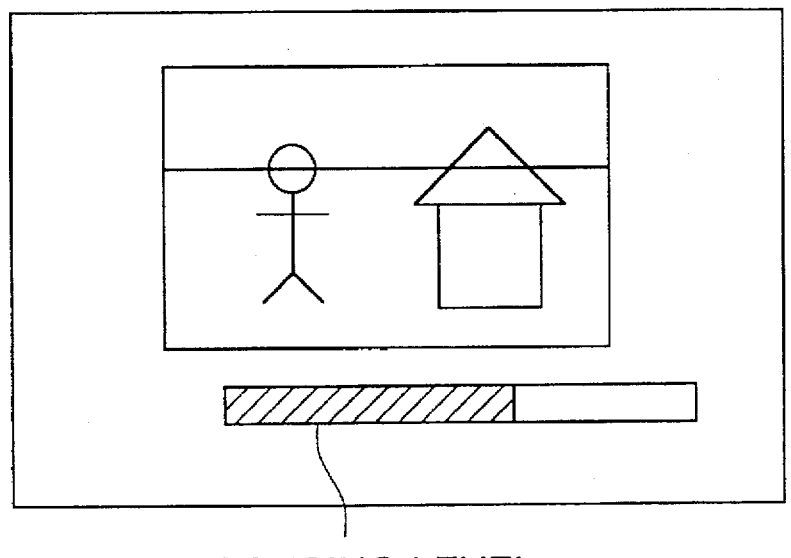

The present example is a variable example of Example 3. Since only machine structure is different, only differences will be explained. FIG. 13 shows a diagram of a photographic image imaging device of the present example. A point different from Example 3 is that there is no negative film carrier directly on the light entrance path side of lens means 572 for imaging. Mirror 551 is provided while insertion is free. Mirror 551 is positioned at 45° to the exposure optical axis on the light entrance side of lens means 572 for imaging or is moved out of the exposure light path. Mirror 551 is supported by rotation axis 552 having a pivoting pin which rotates by means of mirror rotation driving means 557 provided at one end of mirror 551. At the other end of mirror 551, iron plate (ferromagnetic body) is engaged. When mirror 551 is positioned at 45° to the exposure optical axis, the other end of mirror 551 is brought into contact with cushion member 556. This cushion member 556 is fixed and supported by cushion member supporting means 555, which is made of electromagnet, and positioned. Incidentally, when mirror 551 is moved out of the exposure optical axis, it is not necessary to position it precisely. Based on the control by means of control unit 110, the above-mentioned electro-magnet and a double surfaced mirror rotation driving means is controlled by a mirror control means, not illustrated.

Hereunder, position relationship of each means when mirror 551 is positioned at 45° to the exposure optical axis will be explained. At a position extended vertically to the imaging optical axis from the intersection point of mirror 551 and the imaging optical axis, negative film carrier 530 exists as if supporting the color film. Negative film carrier 530 conveys the color film and positions the picked up frame. Negative film carrier 530 is supported by frame 590 integrally with lamp house 510 and imaging means 570.

Lamp house 510 is composed of surface light source 511, light adjusting filter 515, positioned in front of surface light source 511, and light amount sensing means 518, which senses light amount of surface light source 511. By sensing the light amount value of surface light source 511 by means of light amount value sensing means 518, the light amount of surface light source 511 is set to emit a prescribed light amount.

Imaging lens means 572 can adjust focusing from the color film to an infinite distance. Therefore, when mirror 551 is moved out of the exposure light path, three-dimensional object 501 can also be picked up merely by controlling the focus position from near-contact to an infinite distance.

EXAMPLE 5

Figure 17:
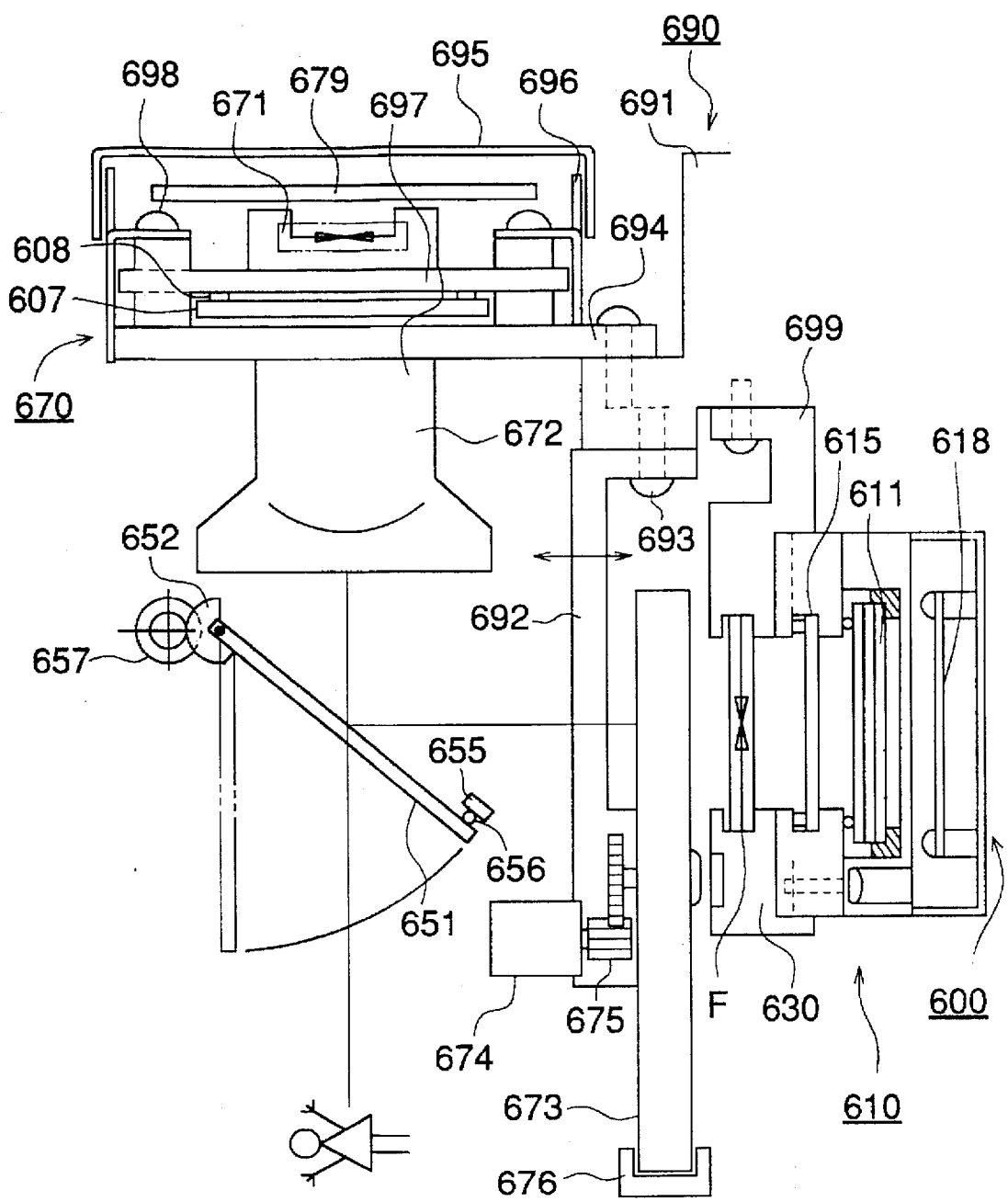
FIG. 17 is a diagram of a photographic image imaging device of Example 5.

The present example is a variable example of Example 2. Since only machine structure is different, only differences will be explained. FIG. 17 shows a diagram of a photographic image imaging device of the present example. One difference from Example 2 is that there is no direct filter supporting means on the light entrance end of lens means 572 for imaging and that mirror 651 pivots freely. Mirror 651 is positioned at 45° to the exposure optical axis at the light entrance end of lens means 572 for imaging or is moved out of the exposure light path. Mirror 651 is supported by rotation axis 652 having a pivoting pin which pivots by means of mirror rotation driving means 657 provided at one end of mirror 651. At the other end of mirror 651, an iron plate (ferromagnetic body) is engaged. When mirror 651 is positioned at 45° to the exposure optical axis, the other end of mirror 651 is brought into contact with cushion member 656. This cushion member 656 is fixed and supported by cushion member supporting means 655, which is made of electromagnet, and positioned. Incidentally, when mirror 651 is moved out of the exposure optical axis, it is not necessary to position it precisely. Based on the control by means of control unit 110, the above-mentioned electromagnet and a double surfaced mirror rotation driving means are controlled by a mirror control means, not illustrated.

Hereunder, the positional relationship of each means when mirror 651 is positioned at 45° to the exposure optical axis will be explained. At the position extended vertically to the imaging optical axis from an intersection point of mirror 651 and the imaging optical axis, a filter supported by filter supporting means 373 and negative film carrier 530 exist as if supporting the color film.

Filter supporting means 673 is the same as the one shown in FIG. 4. Filter supporting means 673 is a disc. At outer periphery, marks 677 for positioning are provided. By sensing these marks 677 by means of mark sensing means 676, B, G and R color light cutting filters are positioned. By means of the above-mentioned filter supporting means rotation position sensing means, the rotation position of filter supporting means 673 is sensed. Filter supporting means 673, through its central axis 678 and gear 675 which is engaged with central axis 678, is rotated and moved by means of driving motor 674 which is a filter supporting means rotation position driving means which rotates and drives filter supporting means 673. In addition, due to a color light cutting filter control signal of the control unit, not illustrated, by means of the filter supporting means rotation position sensing means and the filter supporting means rotation position driving means, the appropriate color light cutting filter is set to the light entrance side of lens means 672 for imaging.

Negative film carrier 630 conveys the color film and positions a frame to be picked up. Negative film carrier 630 is supported by frame 690 which is integral with lamp house 610 and imaging means 670.

Lamp house 610 is composed of surface light source 611, light adjusting filter 615, positioned in front of surface light source 611, and light amount value sensing means 618, which senses light amount value of surface light source 611. By sensing the light amount of surface light source 611 by means of light amount value sensing means 618, the light amount value of surface light source 611 is arranged to have a prescribed light amount value.

Imaging lens means 672 can adjust focusing from the color film to an infinite distance. Therefore, when mirror 651 is moved out of the exposure light path, three-dimensional object can be monochrome picked up only by controlling the focus position from near-contact to an infinite distance.

An image of plural colors are picked up every time image shift is conducted. Therefore, the amount of image shift is reduced relatively. In addition, the position of the image formation point wherein image shift is conducted is not slid. As a result, an image of high quality can be obtained.

The slid amount of image formation position by means of the above-mentioned image shifting means can be changed. Therefore, a single image shifting type imaging apparatus can be used for applications wherein a long time may be required though resolution is high and also for applications wherein resolution may be low though it requires less time.

When the above-mentioned filter for determining exposure is selected by means of the above-mentioned filter changing means, based on image information picked up by means of the above-mentioned imaging means, exposure conditions when plural colors are picked up is determined. Therefore, appropriate image information for determining exposure is obtained with one imaging exposure. In addition, exposure conditions, when imaging plural colors, can be set as appropriate.

When the above-mentioned filter for determining exposure is selected by means of the above-mentioned filter changing means, based on image information picked up by means of the above-mentioned imaging means, exposure conditions when plural colors are picked up are determined. Therefore, appropriate image information for determining exposure is obtained with each imaging. In addition, exposure conditions when imaging plural colors can be set as appropriate. Therefore, the time required for determining exposure is minimized.

Exposure of a high speed imaging mode wherein appropriate image information for determining exposure is obtained for each imaging, exposure conditions when imaging plural colors can be set as appropriate. As a result, both of a mode wherein exposure conditions when imaging for plural colors can be set as appropriate so that high speed imaging, in which time for determining exposure is minimized, can be conducted and a mode having higher accuracy exposure control compared to exposure controlling for each image shift can be subjected to exposure control.

A photographic original image can be picked up when the above-mentioned original unit supporting frame is attached to the above-mentioned frame. When the above-mentioned original unit supporting frame is moved out of the above-mentioned frame, the focus position of the above-mentioned photographic original imaging means can be altered and different imaging can be conducted. Therefore, a three-dimensional object can also be picked up.

Since photographic original imaging means, imaging lens means and image shifting means, whose mounting accuracy is requested, are constantly supported by one free, mounting accuracy each other is desirable. In addition, when the above-mentioned original unit supporting frame is attached to the above-mentioned frame, a photographic original can be picked up. Due to detaching the above-mentioned original unit supporting frame from the above-mentioned free, a light source for imaging can easily be replaced.

Since the color filter is inclined to the vertical surface to the imaging optical axis or has a concave form on the photographic original side of the imaging optical axis, a parallel surfaces are not formed so that internal reflections can effectively be prevented.

Since after sensing rough focus, image shift is conducted only for one line, focus adjustment can be attained at high speed and high accuracy.

While maintaining stability of image, the occurrence of waste of time and electrical power on the CRT reproduction means side is prevented. Productivity as a whole can be improved.

Operations to connect busses which transfer electronic image information is not necessary and it can be connected only by the use of a buss which can transfer signals at high speed. Therefore, when reproducing, reading from a storing means can speedily be conducted.

Even after a large amount of electronic image information, which usually cannot be stored by an non-transportable storing means, is reproduced, if information is stored in a transportable storing medium, information can be reproduced immediately only by reading the transportable storing medium, not by starting with a imaging process which is time consuming.

Reproduction is postponed until a prescribed amount of electronic image information is accumulated, and reproduction is conducted only after the prescribed amount of electronic image information has been accumulated. Thereby, productivity is not lowered, and the occurrence of much waste of the photographic light-sensitive material for printing can be minimized.

Operation to connect pass which transfers electronic image information is not necessary and can be connected only by the use of a pass which can transfer data at high speed. Therefore, when reproducing, reading from a storing means can speedily be conducted.

Even after a large amount of electronic image information, which usually cannot be stored by an non-transportable storing means, is reproduced, if information is stored in a transportable storing medium, information can be reproduced immediately only by reading the transportable storing medium, not by starting with imaging which is time consuming.

A large amount of photographic image, which cannot be stored by an non-transportable storing means, can be reproduced continuously in a large amount, by storing the photographic image in a transportable storing medium. The occurrence of much wasted time on the reproduction means side can be minimized.

Since one unit of photographic image reproducing device can be connected to plural units of other photographic image reproducing devices, the occurrence of much wasted time on the photographic image reproducing devices can be minimized Since one unit of photographic image reproducing device can be connected to plural units of image processing devices, the occurrence of much wasted time on the photographic image reproducing devices can be minimized.

Since the storing memory stores displayed image information produced by the displayed image information producing means, amount used of memory can be reduced.

Since reproduced image information produced by means of reproduced image information producing means is not stored, amount used of memory can be reduced.

What is claimed is:

1. An image pick-up apparatus comprising:
   (a) imaging means comprising a plurality of pixels disposed with a predetermined distance therebetween for picking up an image on a photographic original with respect to a plurality of colors;
   (b) image forming means having an optical axis, for forming the image of the photographic original onto the imaging means;
   (c) pixel shifting means for shifting a focal point of the image on the imaging means by a distance shorter than a distance between the pixels of the imaging means;
   (d) a plurality of color filters having a plurality of colors different from each other; and
   (e) filter selecting means for selecting a color filter from the plurality of color filters and for disposing the selected color filter between the photographic original and the imaging means; and
   (f) controlling means for controlling the imaging means to pick up the image of the photographic original in a first condition that makes the pixel shift means operative, and to pick up the image of the photographic original in a second condition that makes the pixel shift means inoperative, at each time when the controlling means controls the filter selecting means to change a color filter to another color filter of the plurality of color filters.

2. The imaging device of claim 1, wherein the image forming means comprises adjusting means for adjusting a focus point, and
   wherein the adjusting means adjusts the focus point on the basis of a synthesis information of an image information of the photographic original picked up in the first condition and an image information of the photographic original picked up in the second condition.

3. The imaging device of claim 1, wherein the pixel shifting means can be changed in a shift amount of the focus point of the photographic original.

4. The imaging device of claim 1 further comprising:
   an exposure determining filter; and
   exposure condition determining means for determining an exposure condition on the basis of an image information of the photographic original picked up by the imaging means, using the exposure determining filter.

5. The imaging device of claim 1, wherein the plurality of color filters are disposed to be inclined relative to a vertical surface with respect to the optical axis for image formation.

6. The imaging device of claim 1, wherein the plurality of color filters are disposed convex to a photographic original side of the optical axis.

7. A photographic image forming apparatus comprising:
   (a) imaging means comprising a plurality of pixels disposed with a predetermined distance therebetween for picking up an image of a photographic original with respect to a plurality of colors;
   (b) image forming means having an optical axis, for forming the image of the photographic original onto the imaging means;
   (c) pixel shifting means for shifting a focal point of the image on the imaging means by a distance shorter than a distance between the pixels of the imaging means;
   (d) a plurality of color filters having a plurality of colors different from each other; and
   (e) filter selecting means for selecting a color filter from the plurality of color filters and for disposing the selected color filter between the photographic original and the imaging means;
   (f) controlling means for controlling the imaging means to pick up the image of the photographic original in a first condition that makes the pixel shift means operative, and to pick up the image of the photographic original in a second condition that makes the pixel shift means inoperative, at each time when the controlling means controls the filter selecting means to change a color filter to another color filter of the plurality of color filters;
   (g) memory means for storing an image information of the photographic original picked up by the imaging means;
   (h) image processing means for processing the image information stored in the memory means;
   (i) cathode ray tube (CRT) reproducing means having a cathode ray tube (CRT) therein for reproducing an image on the basis of the image information processed by the image processing means on the CRT;
   (j) conveyance means for conveying a photographic light-sensitive material onto a printing position thereof;
   (k) printing means for printing an image reproduced by the CRT reproducing means onto the material; and
   (l) printing control means for controlling a printing operation onto the material,
   wherein the printing control means controls the printing means not to print an image reproduced by the CRT reproducing means when the imaging means is conducting a pick-up operation of an image of the photographic original.

8. The photographic image forming apparatus of claim 7, wherein the image forming means comprises adjusting means for adjusting a focus point, and
   wherein the adjusting means adjusts the focus point on the basis of a synthesis information of an image information of the photographic original picked up in the first condition and an image information of the photographic original picked up in the second condition.

9. The photographic image forming apparatus of claim 7, wherein the pixel shifting means can be changed in a shift amount of the focus point of the photographic original.

10. The photographic image forming apparatus of claim 7 further comprising:

an exposure determining filter; and exposure condition determining means for determining an exposure condition on the basis of an image information of the photographic original picked up by the imaging means, using the exposure determining filter.

11. The photographic image forming apparatus of claim 7, wherein the plurality of color filters are disposed to be inclined relative to a vertical surface with respect to the optical axis for image formation.

12. The photographic image forming apparatus of claim 7, wherein the plurality of color filters are disposed convex to the a photographic original side of the optical axis.

13. The photographic image forming apparatus of claim 7, wherein the memory means comprises a first memory section stationary to a main body of the apparatus and a second memory section removably attachable to the main body of the apparatus.

14. A photographic image forming apparatus comprising:

(a) imaging means comprising a plurality of pixels disposed with a predetermined distance therebetween for picking up an image of a photographic original with respect to a plurality of colors;

(b) image forming means having an optical axis, for forming the image of the photographic original onto the imaging means;

(c) pixel shifting means for shifting a focal point of the image on the imaging means by a distance shorter than a distance between the pixels of the imaging means;

(d) a plurality of color filters having a plurality of colors different from each other; and (e) filter selecting means for selecting a color filter from the plurality of color filters and for disposing selected color filter between the photographic original and the imaging means;

(f) controlling means for controlling the imaging means to pick up the image of the photographic original in a first condition that makes the pixel shift means operative, and to pick up the image of the photographic original in a second condition that makes the pixel shift means inoperative, at each time when the controlling means controls the filter selecting means to change a color filter to another color filter of the plurality of color filters;

(g) memory means for storing an image information of the photographic original picked up by the imaging means;

(h) image processing means for processing the image information stored in the memory means; and (i) cathode ray tube (CRT) reproducing means having a cathode ray tube (CRT) therein for reproducing an image on the basis of the image information processed by the image processing means on the CRT, wherein the memory means stores the image information processed by the image processing means.

15. A photographic image forming apparatus comprising:

(a) imaging means comprising a plurality of pixels disposed with a predetermined distance therebetween for picking up an image of a photographic original with respect to a plurality of colors;

(b) image forming means having an optical axis, for forming the image of the photographic original onto the imaging means;

(c) pixel shifting means for shifting a focal point of the image on the imaging means by a distance shorter than a distance between the pixels of the imaging means;

(d) a plurality of color filters having a plurality of colors different from each other; and (e) filter selecting means for selecting a color filter from the plurality of color filters and for disposing the selected color filter between the photographic original and the imaging means;

(f) controlling means for controlling the imaging means to pick up the image of the photographic original in a first condition that makes the pixel shift means operative, and to pick up the image of the photographic original in a second condition that makes the pixel shift means inoperative, at each time when the controlling means controls the filter selecting means to change a color filter to another color filter of the plurality of color filters;

(g) memory means for storing an image information of the photographic original picked up by the imaging means;

(h) image processing means for processing the image information stored in the memory means;

(i) cathode ray tube (CRT) reproducing means having a cathode ray tube (CRT) therein for reproducing an image on the basis of the image information processed by the image processing means on the CRT, wherein the image information processed by the image processing means is successively sent to the CRT reproducing means without storing in the memory means in a second time.

* * * * *